(12) United States Patent
Dobbs et al.

(10) Patent No.: US 9,111,463 B2
(45) Date of Patent: Aug. 18, 2015

(54) INTERACTIVE SPEECH SYNTHESIZER FOR ENABLING PEOPLE WHO CANNOT TALK BUT WHO ARE FAMILIAR WITH USE OF ANONYM MOVEABLE PICTURE COMMUNICATION TO AUTONOMOUSLY COMMUNICATE USING VERBAL LANGUAGE

(75) Inventors: Glen Dobbs, Waterbury, CT (US); Kevin Miller, Waterbury, CT (US)

(73) Assignee: PROXTALKER.COM, LLC, Waterbury, CT (US)

( * ) Notice: Subject to any disclaimer, the term of this patent is extended or adjusted under 35 U.S.C. 154(b) by 345 days.

(21) Appl. No.: 12/802,996

(22) Filed: Jun. 17, 2010

(65) Prior Publication Data

US 2010/0262426 A1 Oct. 14, 2010

Related U.S. Application Data

(63) Continuation-in-part of application No. 11/180,061, filed on Jul. 13, 2005.

(60) Provisional application No. 60/589,910, filed on Jul. 20, 2004.

(51) Int. Cl.
*G09B 19/04* (2006.01)
*G09B 21/00* (2006.01)
(Continued)

(52) U.S. Cl.
CPC ............... *G09B 21/00* (2013.01); *G09B 5/062* (2013.01); *G09B 19/04* (2013.01); *G10L 13/00* (2013.01);
(Continued)

(58) Field of Classification Search
CPC ........ G09B 5/062; G09B 19/04; G09B 5/065; G09B 17/00; G09B 3/02; G09B 5/06; G09B 21/00; G09B 21/009; B42D 3/123; B42D 15/022; G03B 31/06; G11B 23/44; G10L 15/26; G10L 13/00; G10L 2021/0575; Y10S 345/901
USPC .......... 434/112, 116, 266, 262, 267; 704/271, 704/207, 200.1, 216, 217; 600/25, 559; 381/58, 60, 312, 320, 321; 607/55, 56
See application file for complete search history.

(56) References Cited

U.S. PATENT DOCUMENTS

| 4,465,465 A | 8/1984 | Nelson |
| 4,681,548 A | 7/1987 | Lemelson |

(Continued)

OTHER PUBLICATIONS

Disable World, www.disabled-world.com, Nov. 26, 2010, 1 page, Article by Alfred published Feb. 17, 2009.

(Continued)

*Primary Examiner* — Jack Yip
(74) *Attorney, Agent, or Firm* — Andrew F. Young, Esq; Lackenbach Siegel, LLP

(57) ABSTRACT

A method for enabling a person who cannot talk but who is familiar with use of anonym moveable picture communication to autonomously communicate speech sound automatically in a sequence, and may include: choosing a plurality of selected encoded tags that are transitionable between a ready mode in which the tag is proximate to an associated tag reader and a go mode in which the tag is in operative association with the associated tag reader. In the go mode, the selected plurality of the encoded tags are read in a sequence to provide a series of coded signals, a sound file corresponding to the series of coded signals is transmitted to an audio output device to convert the sound file automatically into the speech sound.

18 Claims, 21 Drawing Sheets

(51) Int. Cl.
　　 G09B 5/06 (2006.01)
　　 G10L 13/00 (2006.01)
　　 G10L 15/26 (2006.01)
　　 G09B 17/00 (2006.01)
　　 B42D 3/12 (2006.01)
　　 G10L 21/057 (2013.01)

(52) U.S. Cl.
　　 CPC ............. *B42D 3/123* (2013.01); *G09B 17/00* (2013.01); *G09B 21/009* (2013.01); *G10L 15/26* (2013.01); *G10L 2021/0575* (2013.01); *Y10S 345/901* (2013.01)

(56) References Cited

U.S. PATENT DOCUMENTS

| | | | |
|---|---|---|---|
| 4,785,420 A | 11/1988 | Little | |
| 4,969,096 A | 11/1990 | Rosen et al. | |
| 4,980,919 A | 12/1990 | Tsai | |
| 5,154,614 A | 10/1992 | Matsuoka et al. | |
| 5,161,975 A | 11/1992 | Andrews | |
| 5,169,342 A | 12/1992 | Steele et al. | |
| 5,188,533 A | 2/1993 | Wood | |
| 5,433,610 A | 7/1995 | Godfrey | |
| 5,520,544 A | 5/1996 | Manico et al. | |
| 5,556,283 A | 9/1996 | Stendardo | |
| 5,557,269 A | 9/1996 | Montane | |
| 5,574,519 A | 11/1996 | Manico et al. | |
| 5,725,379 A | 3/1998 | Perry | |
| 5,813,861 A | 9/1998 | Wood | |
| 5,821,119 A * | 10/1998 | Hagiwara et al. | ......... 435/320.1 |
| 5,851,119 A | 12/1998 | Sharpe | |
| 5,895,219 A | 4/1999 | Miller | |
| 5,902,112 A | 5/1999 | Mangold | |
| 5,954,514 A | 9/1999 | Haas et al. | |
| 6,056,549 A | 5/2000 | Fletcher | |
| 6,068,485 A | 5/2000 | Linebarger | |
| 6,072,980 A | 6/2000 | Manico et al. | |
| 6,190,174 B1 * | 2/2001 | Lam | .............. 434/169 |
| 6,363,239 B1 | 3/2002 | Tutt et al. | |
| 6,464,503 B1 | 10/2002 | Heit et al. | |
| 6,525,706 B1 | 2/2003 | Rehkemper | |
| 6,650,870 B2 | 11/2003 | White et al. | |
| 6,661,407 B2 | 12/2003 | Severson | |
| 7,066,781 B2 | 6/2006 | Weston | |
| 7,556,444 B2 | 7/2009 | Kurashina et al. | |
| 7,744,372 B1 | 6/2010 | Minnich et al. | |
| 7,812,979 B2 | 10/2010 | Takada et al. | |
| 2002/0158849 A1 * | 10/2002 | Severson | ...................... 345/173 |
| 2002/0193047 A1 | 12/2002 | Weston | |
| 2003/0022143 A1 | 1/2003 | Kirwan | |
| 2003/0225570 A1 * | 12/2003 | Boys | ................................ 704/3 |
| 2004/0186713 A1 | 9/2004 | Gomas et al. | |
| 2004/0219501 A1 | 11/2004 | Small | |
| 2005/0236469 A1 * | 10/2005 | Chen | ............................ 235/375 |

OTHER PUBLICATIONS

Teaching Reading in Braille, blindness.growingstrong.org, Nov. 26, 2010, pp. 1-21 by Sarah J. Blake.

Electronic Braille Tutor Teaches Independence, www.nsf.gov, Nov. 26, 2010, pp. 1-2.

SAL2Braille Literacy on the TTT, http://exceptionalteaching.net, Nov. 26, 2010, pp. 1-2.

* cited by examiner

INTERACTIVE SPEECH SYNTHESIZER FOR ENABLING PEOPLE WHO CANNOT TALK BUT WHO ARE FAMILIAR WITH USE OF ANONYM MOVEABLE PICTURE COMMUNICATION TO AUTONOMOUSLY COMMUNICATE USING VERBAL LANGUAGE

1. CROSS REFERENCE TO RELATED APPLICATIONS

The instant application is a continuation-in-part application of application Ser. No. 11/180,061, filed on Jul. 13, 2005, for INTERACTIVE SPEECH SYNTHESIZER FOR ENABLING PEOPLE WHO CANNOT TALK BUT WHO ARE FAMILIAR WITH USE OF ANONYM MOVEABLE PICTURE COMMUNICATION TO AUTONOMOUSLY COMMUNICATE USING VERBAL LANGUAGE, which is incorporated herein by reference thereto, and which is a non-provisional application claiming priority from provisional application No. 60/589,910, filed Jul. 20, 2004, entitled PICTURE EXCHANGE BINDER WITH TALKING BOX, and which is incorporated herein by reference thereto.

2. BACKGROUND OF THE INVENTION

A. Field of the Invention.

The embodiments of the present invention relate to an interactive speech synthesizer, and more particularly, the embodiments of the present invention relate to an interactive speech synthesizer for enabling people who cannot talk but who are familiar with use of anonym moveable picture communication to autonomously communicate using verbal language.

B. Description of the Prior Art

Non-vocal mentally handicapped persons have extreme difficulty in communicating even basic desires and needs to those who are charged with their care. This results in a great deal of frustration—both for the handicapped person and for those who care for them.

Numerous innovations for speech synthesizers have been provided in the prior art, which will be described below in chronological order to show advancement in the art, and which are incorporated herein by reference thereto. Even though these innovations may be suitable for the specific individual purposes to which they address, however, they differ from the embodiments of the present invention in that they do not teach an interactive speech synthesizer for enabling people who cannot talk but who are familiar with use of anonym moveable picture communication to autonomously communicate using verbal language.

(1) U.S. Pat. No. 4,465,465 to Nelson.

U.S. Pat. No. 4,465,465 issued to Nelson on Aug. 14, 1984 teaches a communications device for use by severely handicapped persons having speech impairments and capable of only spastic movements. The device includes a housing in which speech reproduction apparatus is located for storing and reproducing pre-recorded audio message segments. The exterior of the housing has a nearly horizontal front portion on a console on which three relatively large—approximately 5" times 5"—pressure-operated paddle switch actuator members are located. A vertical display panel is located immediately behind the paddle actuators and has on it visual aid cards that have a symbol identical to the recorded message that is to be reproduced by actuation of the appropriate paddle. Pressure on the selected paddle closes a switch, which turns on a light associated with the selected visual aid card and also actuates the reproduction of an audio message corresponding to the visual aid card.

(2) U.S. Pat. No. 4,681,548 to Lemelson.

U.S. Pat. No. 4,681,548 issued to Lemelson on Jul. 21, 1987 teaches an electronic system and method employing a plurality of record sheets or cards for teaching, training, quizzing, testing, and game playing when a person interacts therewith. In one form, a record card containing printed matter is inserted into a receptacle in a support and caused to move along a guide to an operating position where its printed face may be viewed and read. As it so travels, coded information on a border portion of the card is sensed to generate coded electrical signals that are applied to effect one or more functions, such as the programming of a computer, the selection of recordings from a memory, the generation of selected speech signals and sounds thereof, the control of a display or other interactive device or devices, the activation or control of a scoring means, or the selective activation of testing electronic circuitry. In another form, one of a plurality of record cards is selectively disposed in a U-shaped receptacle or the like by hand and a coded edge portion thereof is read to generate coded electrical signals to identify the card or its printed contents. The card or sheet is predeterminately positioned on one or more selected areas thereof—which are indicated by printing—are pressed by finger to close selected switches of a plurality of pressure sensitive switches to provide signal or circuit apparatus for performing such functions as answering questions, programming computing electrical circuits, selecting recordings from a memory, activating a display generating select speech from a memory, scoring, etc.

(3) U.S. Pat. No. 4,980,919 to Tsai.

U.S. Pat. No. 4,980,919 issued to Tsai on Dec. 25, 1990 teaches a language practicing set that can under a recording state store voice signals by way of a voice synthesizer into a memory with different addresses through different coding holes on each of the message cards. Upon a replaying state the various coding holes on the message cards can be decoded to have the voice signal stored in various memory addresses selected and replayed through the voice synthesizer.

(4) U.S. Pat. No. 5,188,533 to Wood.

U.S. Pat. No. 5,188,533 issued to Wood on Feb. 23, 1993 teaches a three-dimensional indicia bearing unit including a voice synthesis chip, a battery, and an amplifier/speaker for synthesizing an audible sound for educational purposes, such as an interactive method for learning to read. The audible sound produced is the name and/or associated sound of the indicia bearing unit. The indicia bearing unit may be a letter, number, or alternatively, a short vowel or a long vowel form of a letter to produce the audible sound of the phonetic pronunciation of the letter. A plurality of unique indicia bearing units—organized in a selected sequence—form a set retained in a book like holder. The chip, battery, and amplifier/speaker may be self-contained within each indicia bearing unit. Alternatively, the indicia bearing unit may have a book configuration with several three-dimensional letters or numbers in a fixed or removable configuration, with the chip, battery, and amplifier/speaker being contained within the book-like unit. The removable three dimensional letters or numbers act as an electrical contact switch or have individual radio frequency transmitters sending a dedicated radio frequency signal to a receiver contained within the indicia bearing unit to activate the voice synthesis chip and produce an audible sound represented by the applicable indicia.

(5) U.S. Pat. No. 5,433,610 to Godfrey et al.

U.S. Pat. No. 5,433,610 issued to Godfrey et al. on Jul. 18, 1995 teaches an educational device for children to accelerate learning from recognition, language acquisition, awareness of cause and effect, and association. The device houses discrete photos of environmental people, animals, and/or inanimate objects recognizable to the child, with each photo being operatively connected to a discrete pre-recorded message, such that upon a photo being pressed, the discrete and corresponding pre-recorded message is played. The child's learning is accelerated by repetitive use of the device.

(6) U.S. Pat. No. 5,556,283 to Stendardo et al.

U.S. Pat. No. 5,556,283 issued to Stendardo et al. on Sep. 17, 1996 teaches an electronic learning system utilizing a plurality of coded cards on which sensory-information representations are provided to present pictorial-symbol information and/or language-symbol information. A housing contains card slots in combination with a visually and functionally distinctive button associated with each individual card slot and a button associated in an equal manner to all card slots, with a card being insertable in each of the card slots. The operator can cause the system to generate unique audible information associated with the sensory-information representation provided on any selected card by pressing the visually and functionally distinctive button associated with the card slot in which the card is inserted. The operator can also cause the system to generate—automatically and sequentially—unique audible information associated with the sensory-information representation provided on each inserted card, and depending on the type of cards installed, perform secondary functions as the individual cards are being accessed, such as mathematical computations, pattern recognition, and spelling accuracy, by pressing the visually and functionally distinctive button associated in an equal manner with all card slots, after which automatic tertiary functions take place, such as: the accuracy of the result of mathematical computations are accessed and an audible message is generated; an audible message equivalent to the combination of the installed cards is generated; and the accuracy of the spelling of words formed by individual cards is determined and an audible message is generated.

(7) U.S. Pat. No. 5,851,119 to Sharpe III et al.

U.S. Pat. No. 5,851,119 issued to Sharpe III et al. on Dec. 22, 1998 teaches an interactive electronic graphics tablet utilizing two windows—one large window for the insertion of a standard sheet of paper or other material allowing the user to draw images on the paper and another smaller second window. A cartridge having various icons—such as animal images—is clicked into place in the smaller window. The device is configured such that the paper overlays a touch sensitive pad. Operation allows the user to assign any cell of the drawn page corresponding to XY coordinates to particular sounds correlated to the icons in the smaller second window by touching respective locations and icons.

(8) U.S. Pat. No. 6,068,485 to Linebarger et al.

U.S. Pat. No. 6,068,485 issued to Linebarger et al. on May 30, 2000 teaches a computer-operated system for assisting aphasics in communication. The system includes user-controlled apparatus for storing data representing the user's vocalizations during a time interval, apparatus for associating the data stored in each of a plurality of such intervals with an icon, apparatus for ordering a plurality of such icons in a group representing a speech message, and apparatus for generating an audio output from the stored data represented by the icons in the group so as to provide a speech message.

(9) U.S. Pat. No. 6,525,706 to Rehkemper et al.

U.S. Pat. No. 6,525,706 issued to Rehkemper et al. on Feb. 25, 2003 teaches an electronic picture book including a plurality of pages graphically depicting or telling a story. The book further includes an LCD screen and a speaker to provide a reader with animation sequences and sounds relating to the graphical pictures on the pages. A set of buttons is provided to trigger the animation sequences and sounds. While reading the book, each page indicates a button to depress. The reader—depressing the correct button—is then provided with animation sequences and sounds indicative to the graphic representations on the page.

(10) United States Patent Application Publication Number 20020193047A1 to Weston.

United States Patent Application Publication Number 20020193047 A1 published to Weston on Dec. 19, 2002 teaches a playmate toy or similar children's toy having an associated wireless, batteryless ID tag readable from and/or written to using a radio-frequency communication protocol. The tag is mounted internally within a cavity of the toy and thereby provides wireless communication of stored information without requiring removal and reinsertion of the tag. In this manner, a stuffed animal or other toy can be quickly and easily identified non-invasively without damaging the toy. Additional information—e.g., unique personality traits, special powers, skill levels, etc.—can also be stored on the ID tag, thus providing further personality enhancement, input/output programming, simulated intelligence, and/or interactive gaming possibilities.

(11) United States Patent Application Publication Number 20040219501 A1 to Small et al.

United States Patent Application Publication Number 20040219501 A1 published to Small et al. on Nov. 4, 2004 teaches an interactive book reading system responsive to a human finger presence. The system includes a radio frequency scanning circuit, a control circuit, a memory, and an audible output device. The RF scanning circuit is configured to detect the presence of the human finger when the finger enters an RF field generated by the RF scanning circuit. The control circuit and the memory are in communication with the RF scanning circuit. The memory stores a plurality of audible messages. The audible output device is also in communication with the control circuit. The audible output device outputs at least one of the audible messages based on an analysis of the RF field performed by the control circuit when the finger enters the RF field.

It is apparent that numerous innovations for voice synthesizers have been provided in the prior art that are adapted to be used. Furthermore, even though these innovations may be suitable for the specific individual purposes to which they address, however, they would not be suitable for the purposes of the embodiments of the present invention as heretofore described, namely, an interactive speech synthesizer for enabling people who cannot talk but who are familiar with use of anonym moveable picture communication to autonomously communicate using verbal language.

3. SUMMARY OF THE INVENTION

Thus, an object of the embodiments of the present invention is to provide an interactive speech synthesizer for enabling people who cannot talk but who are familiar with use of anonym moveable picture communication to autonomously communicate using verbal language, which avoids the disadvantages of the prior art.

Briefly stated, another object of the present invention is to provide a method for enabling a person, who cannot talk but who is familiar with use of anonym moveable picture communication, to autonomously communicate speech sound automatically in a sequence. The method includes the steps of choosing a plurality of selected encoded tags—each having apparatus for it to be identified by the person, providing an interactive speech synthesizer, arranging each of the plurality of the selected encoded tags to be movable between a ready mode wherein it is proximate to an associated tag reader and a go mode wherein it is in operative association with the associated tag reader, providing in the go mode for each of the plurality of the tag reader to read data from its associated one of the selected plurality of the encoded tags in the sequence to provide a series of coded signals, transmitting the series of coded signals to a microcontroller, causing the microcontroller to organize a sound file corresponding to the series of coded signals, and transmitting the sound file to an audio output device to convert the sound file automatically into the speech sound.

The novel features that are considered characteristic of the embodiments of the present invention are set forth in the appended claims. The embodiments of the present invention themselves, however, both as to their construction and their method of operation, together with additional objects and advantages thereof, will be best understood from the following description of the specific embodiments when read and understood in connection with the accompanying figures of the drawing.

4. BRIEF DESCRIPTION OF THE DRAWING

The figures of the drawing are briefly described as follows.

Figure 1:
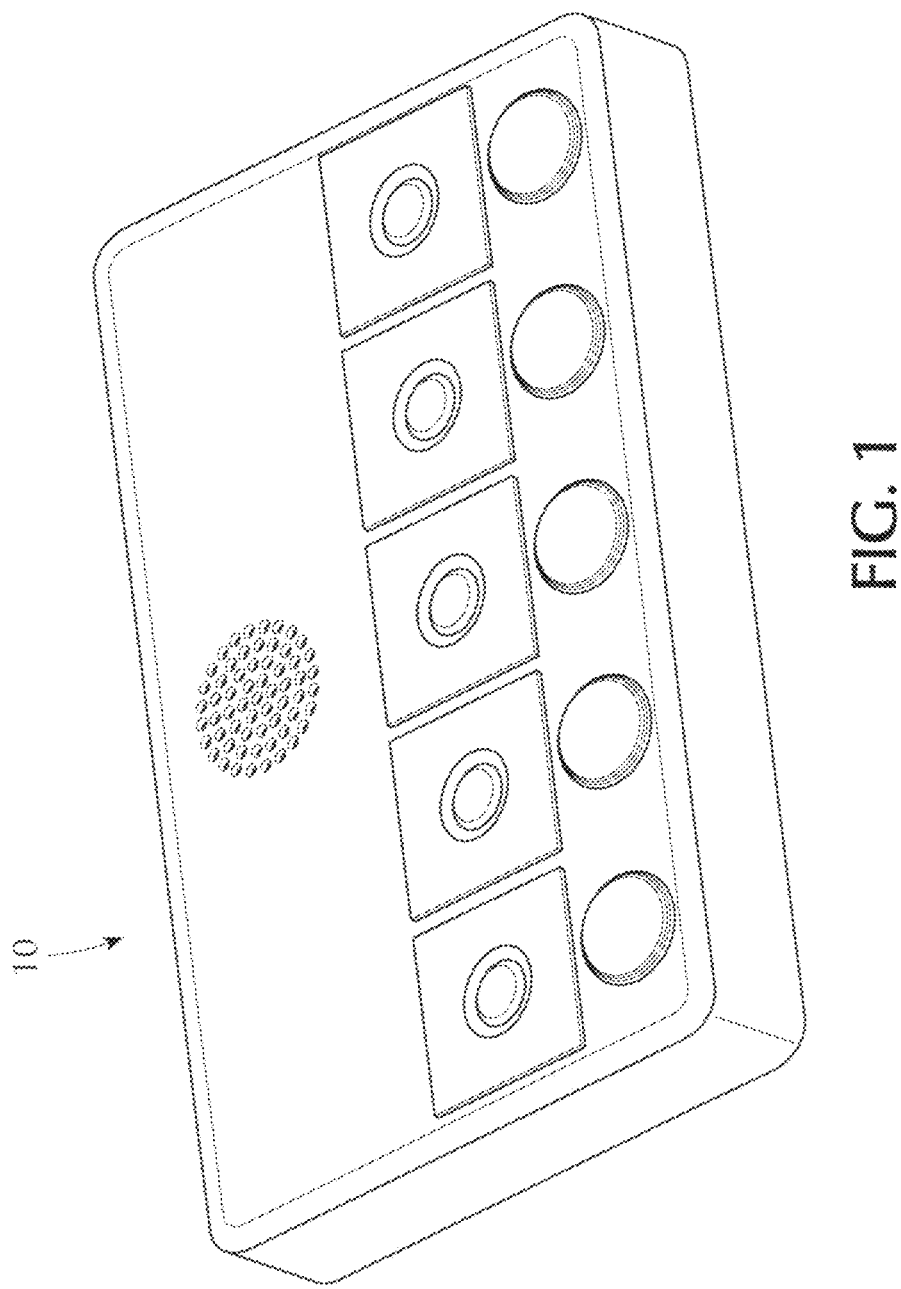
FIG. 1 is a diagrammatic perspective view of the interactive speech synthesizer of the present invention for enabling people who cannot talk but who are familiar with use of anonym moveable picture communication to autonomously communicate using verbal language.
Figure 3:
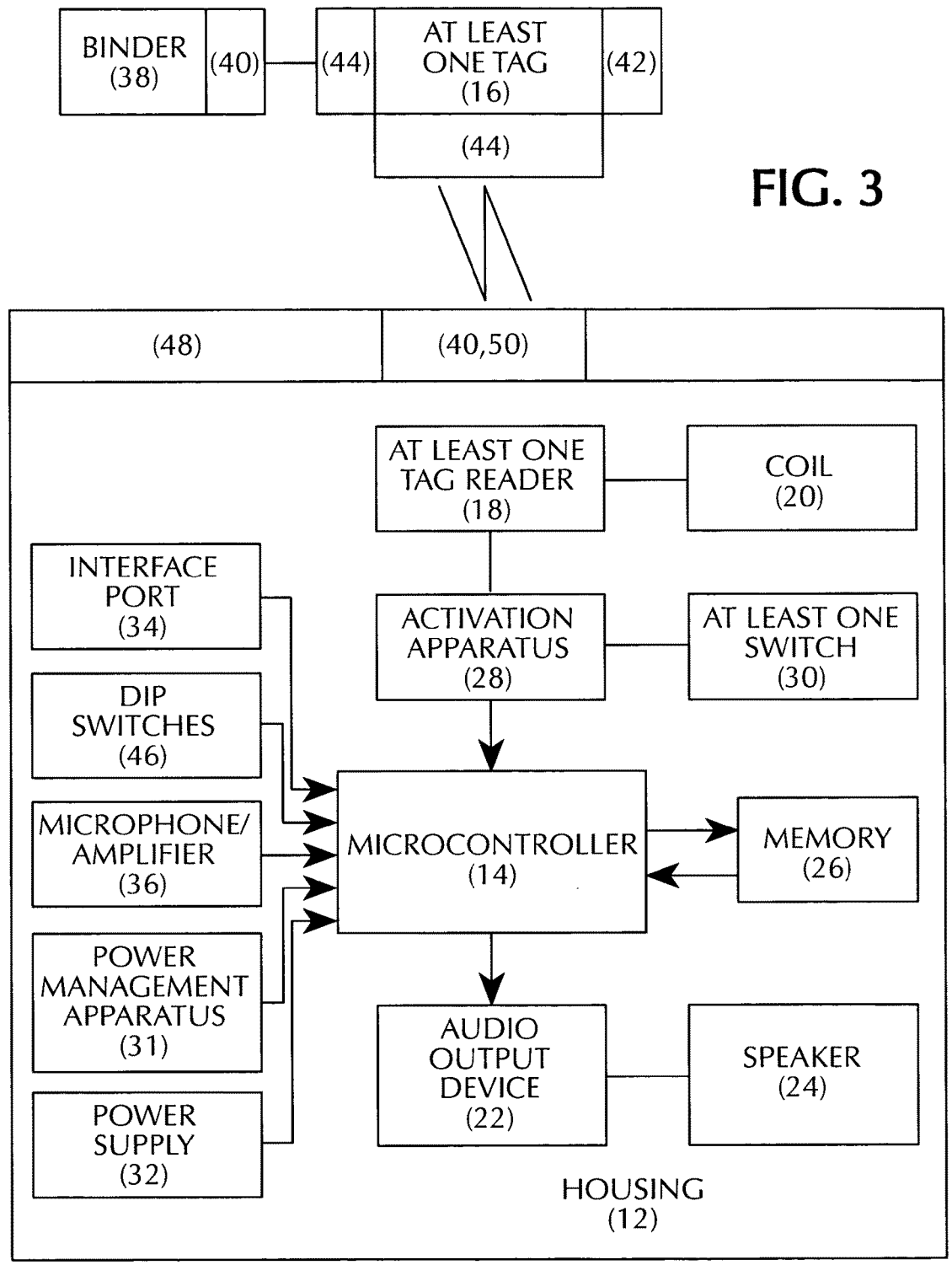
Figure 4A:
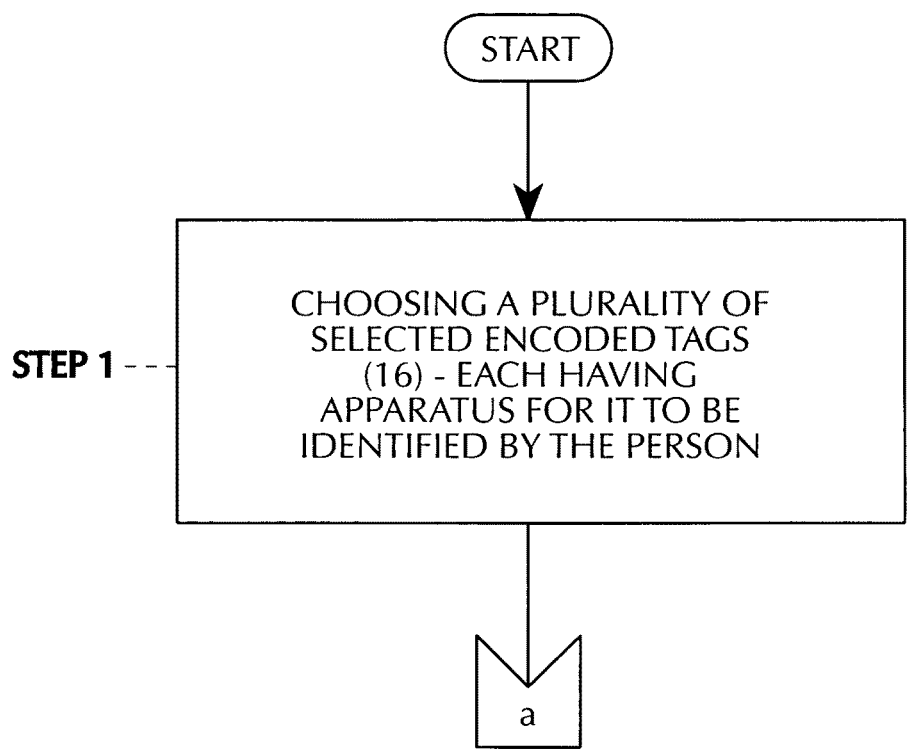
Figure 4B:
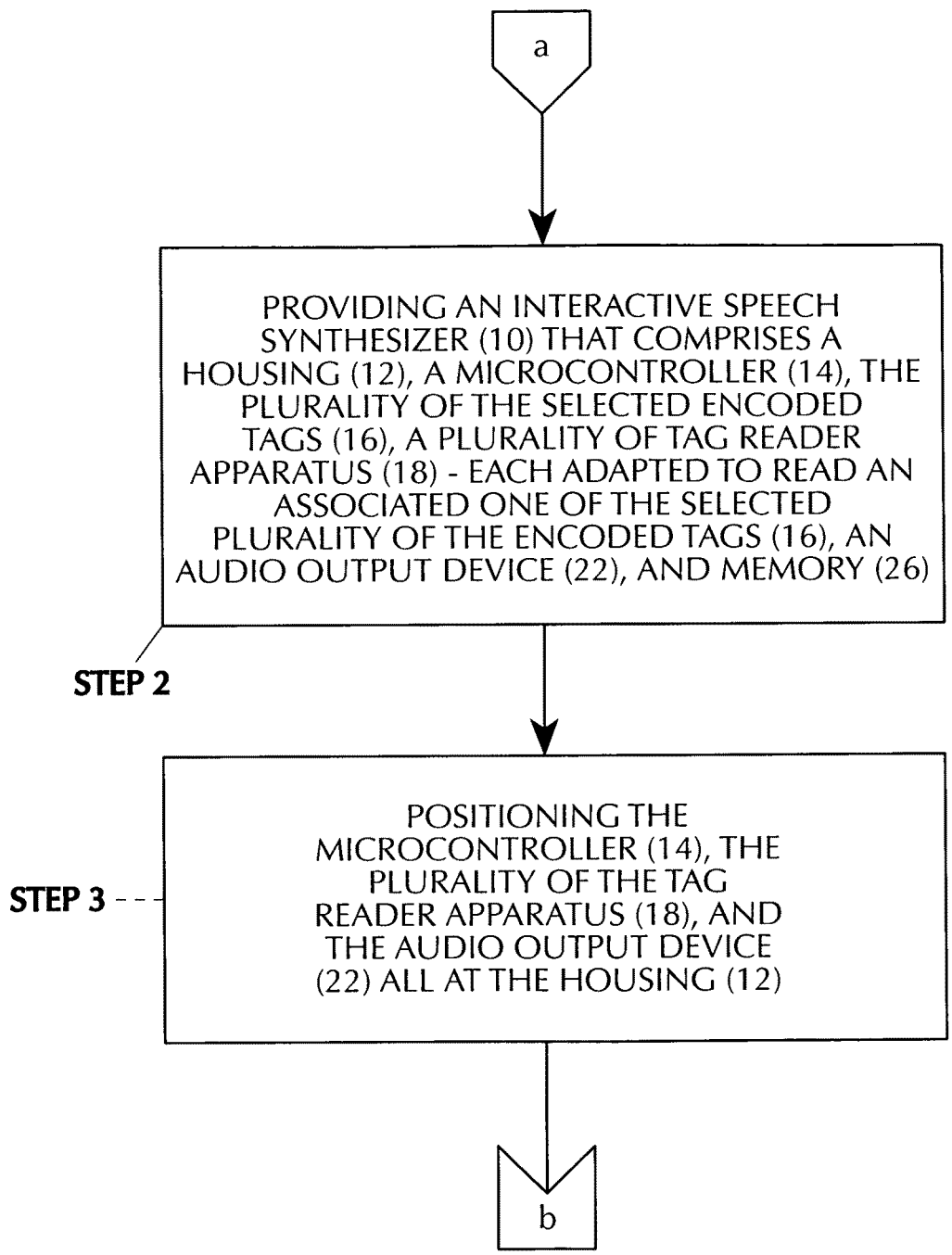
Figure 4C:
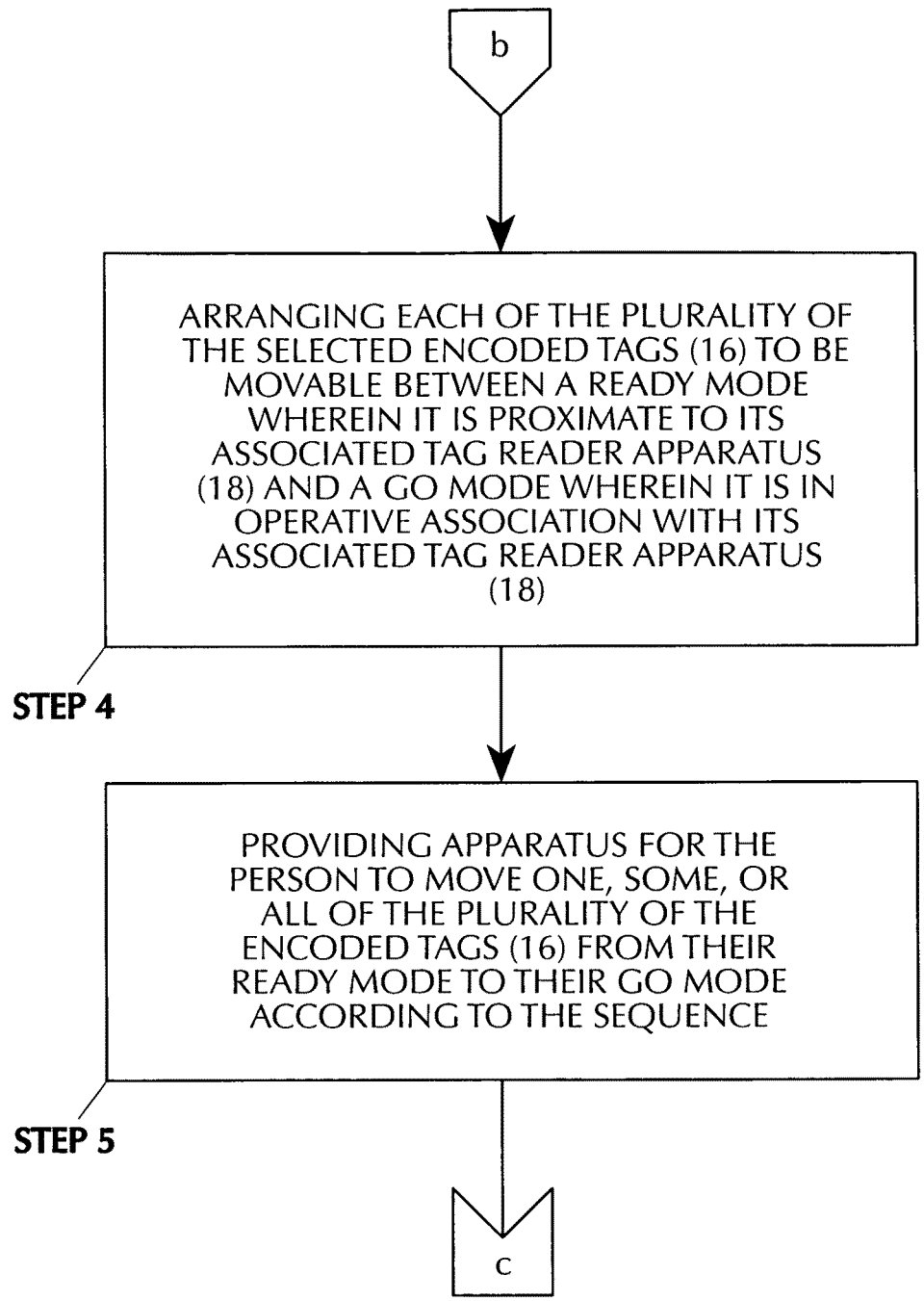
Figure 4D:
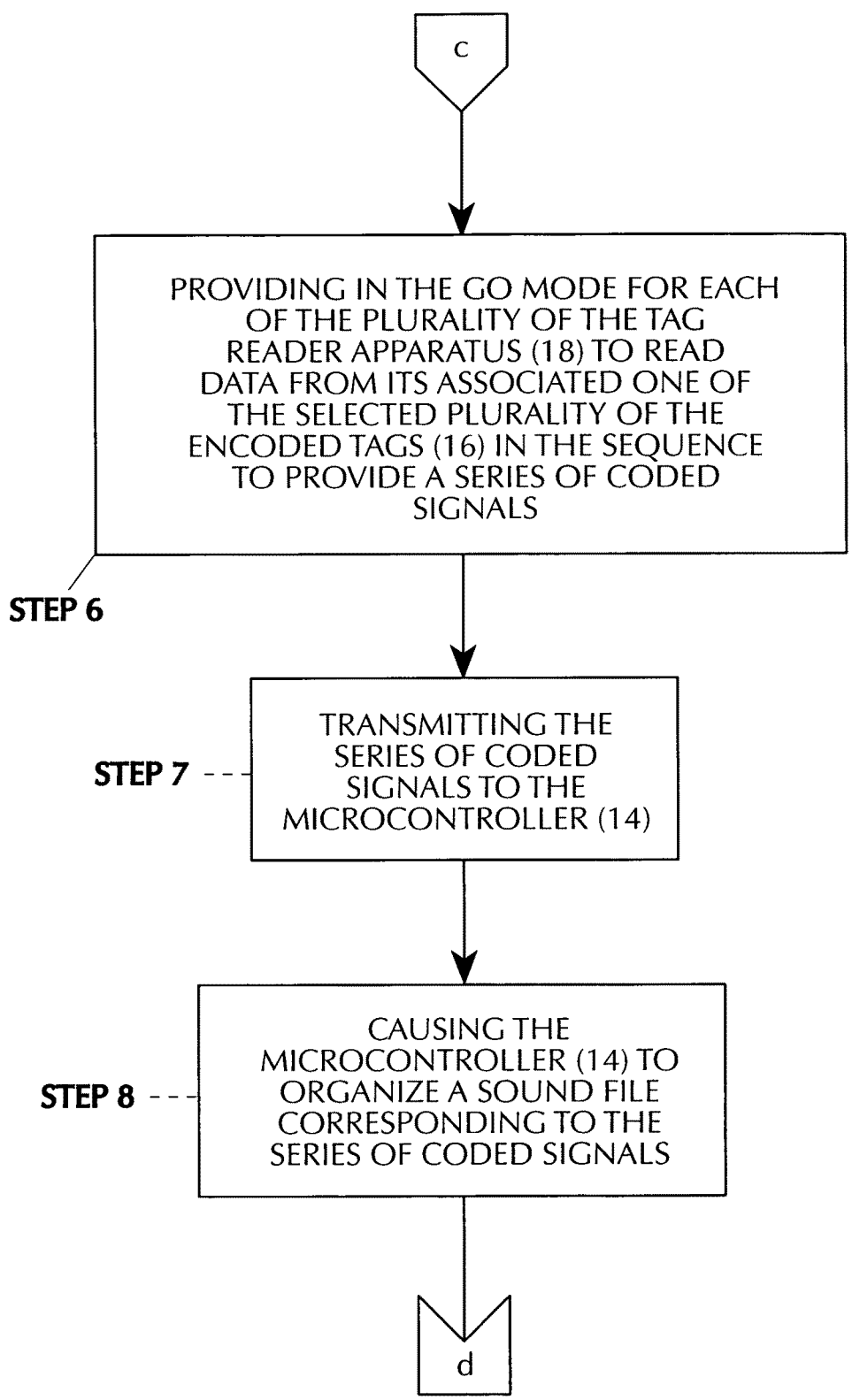
Figure 4E:
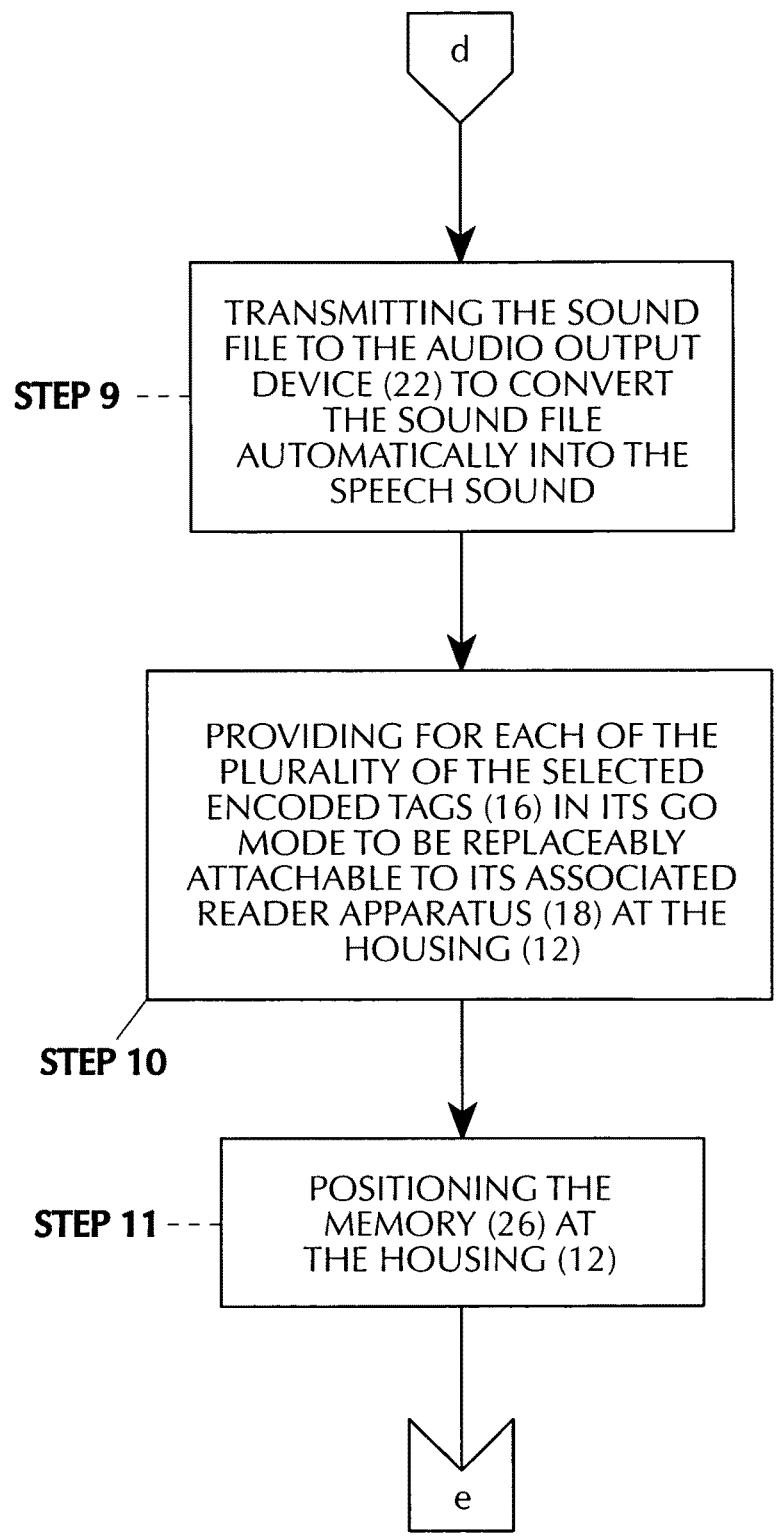
Figure 4F:
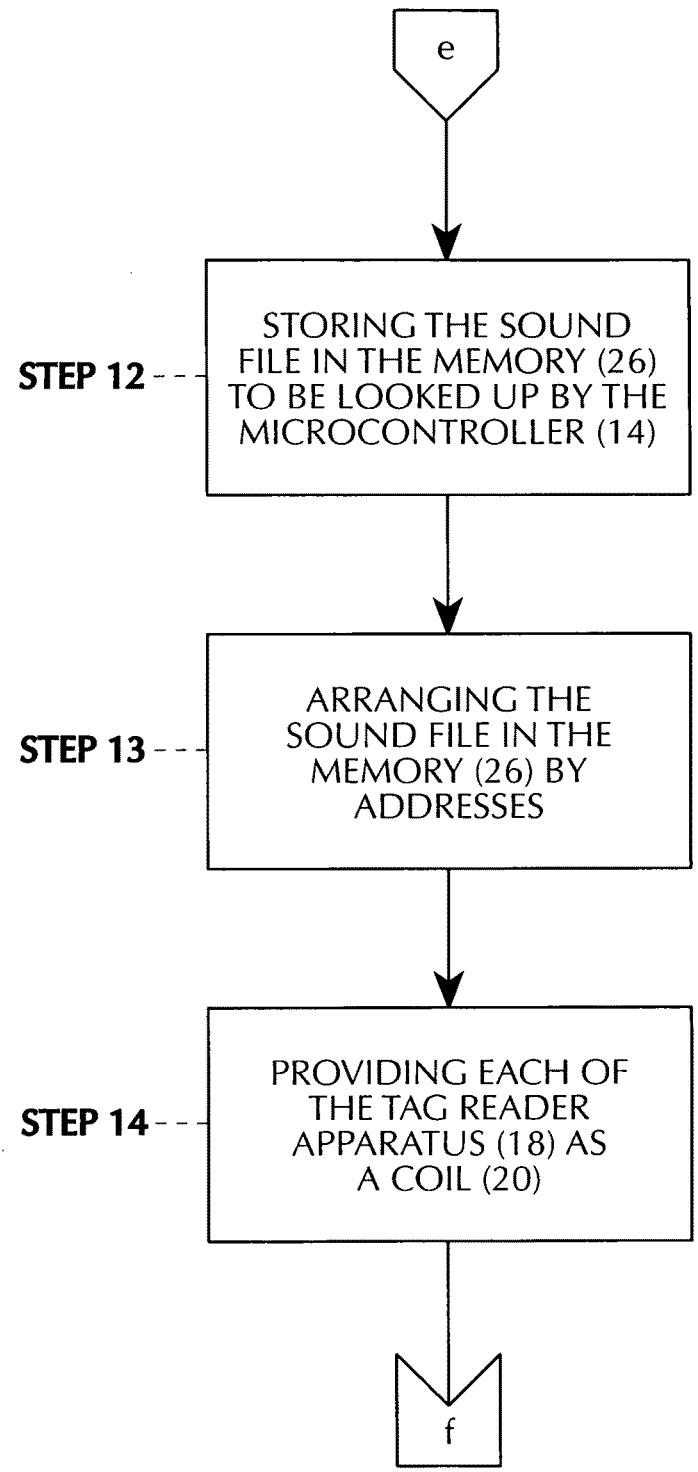
Figure 4G:
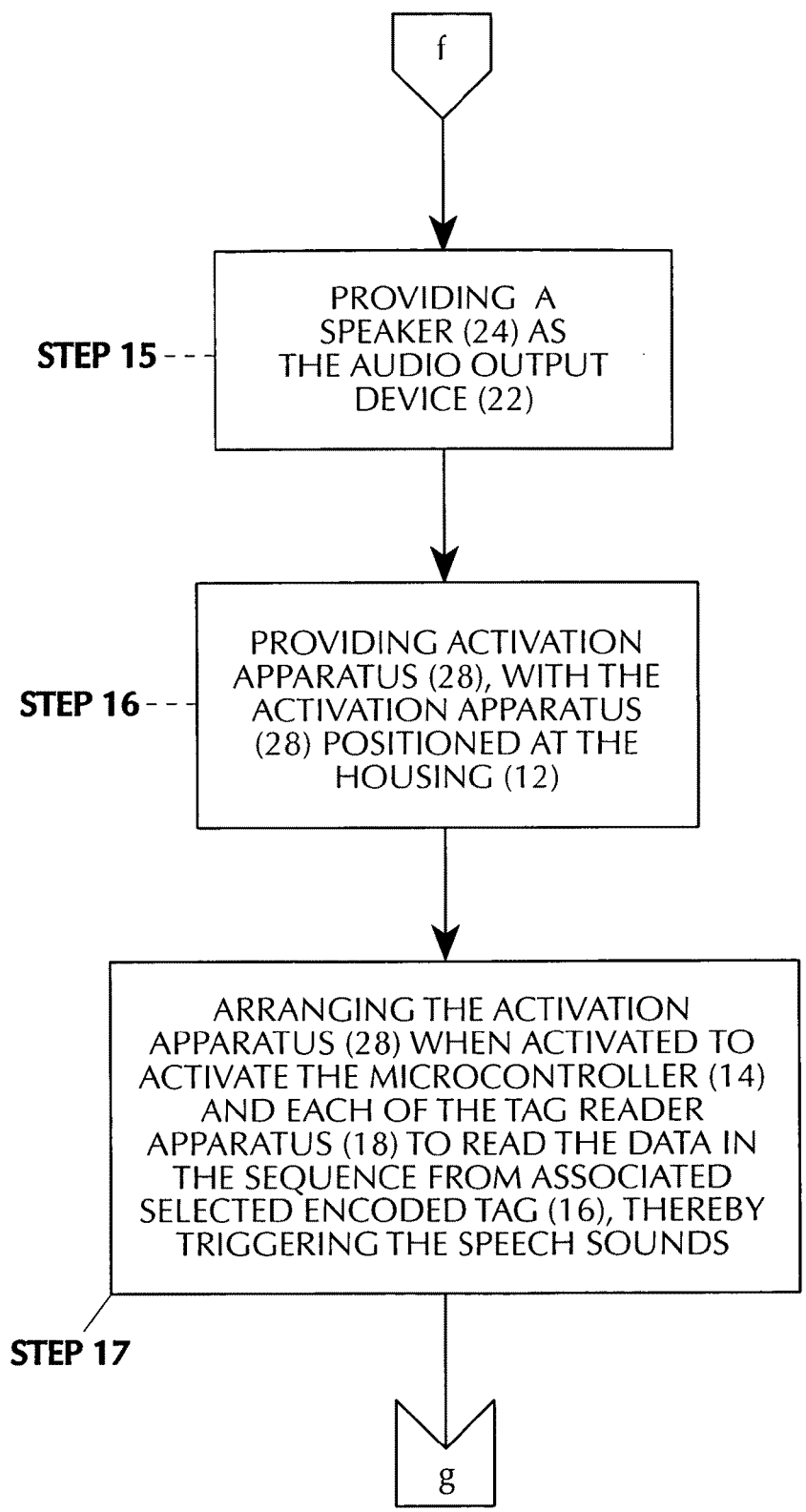
Figure 4H:
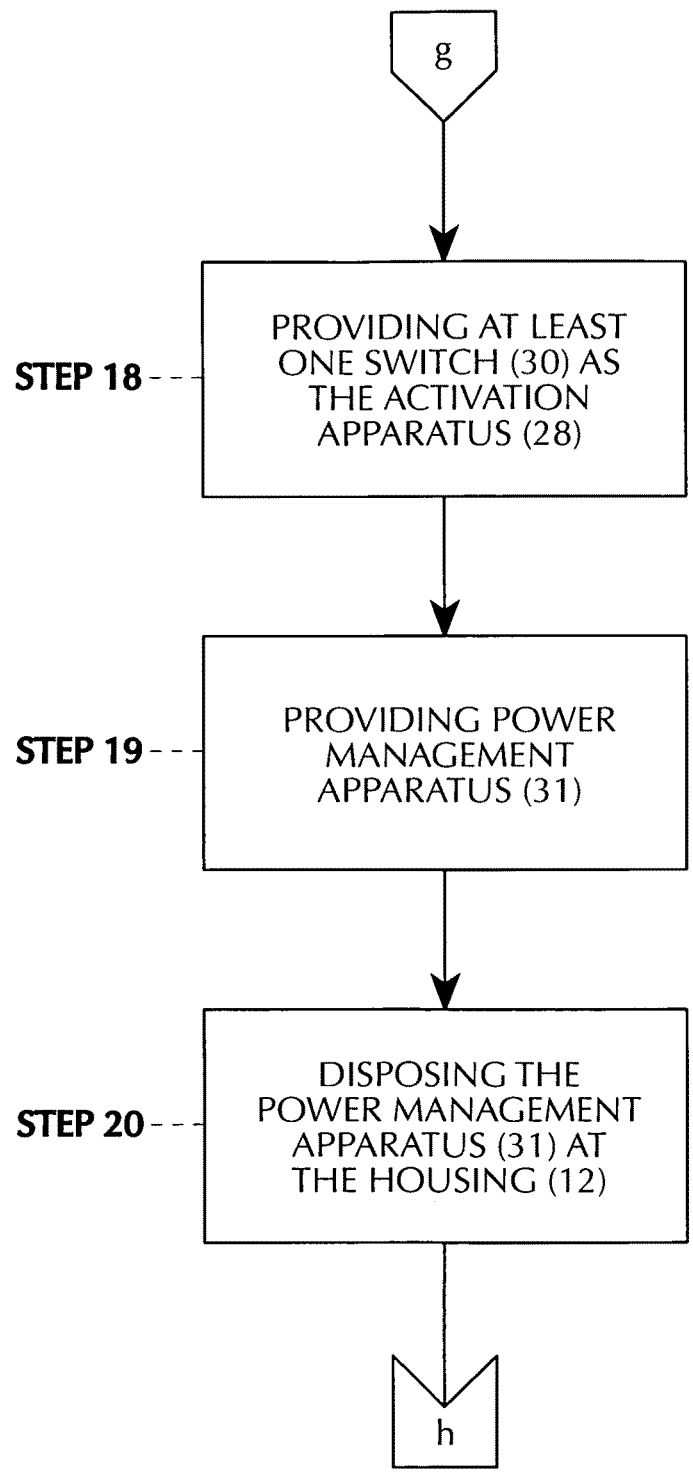
Figure 4I:
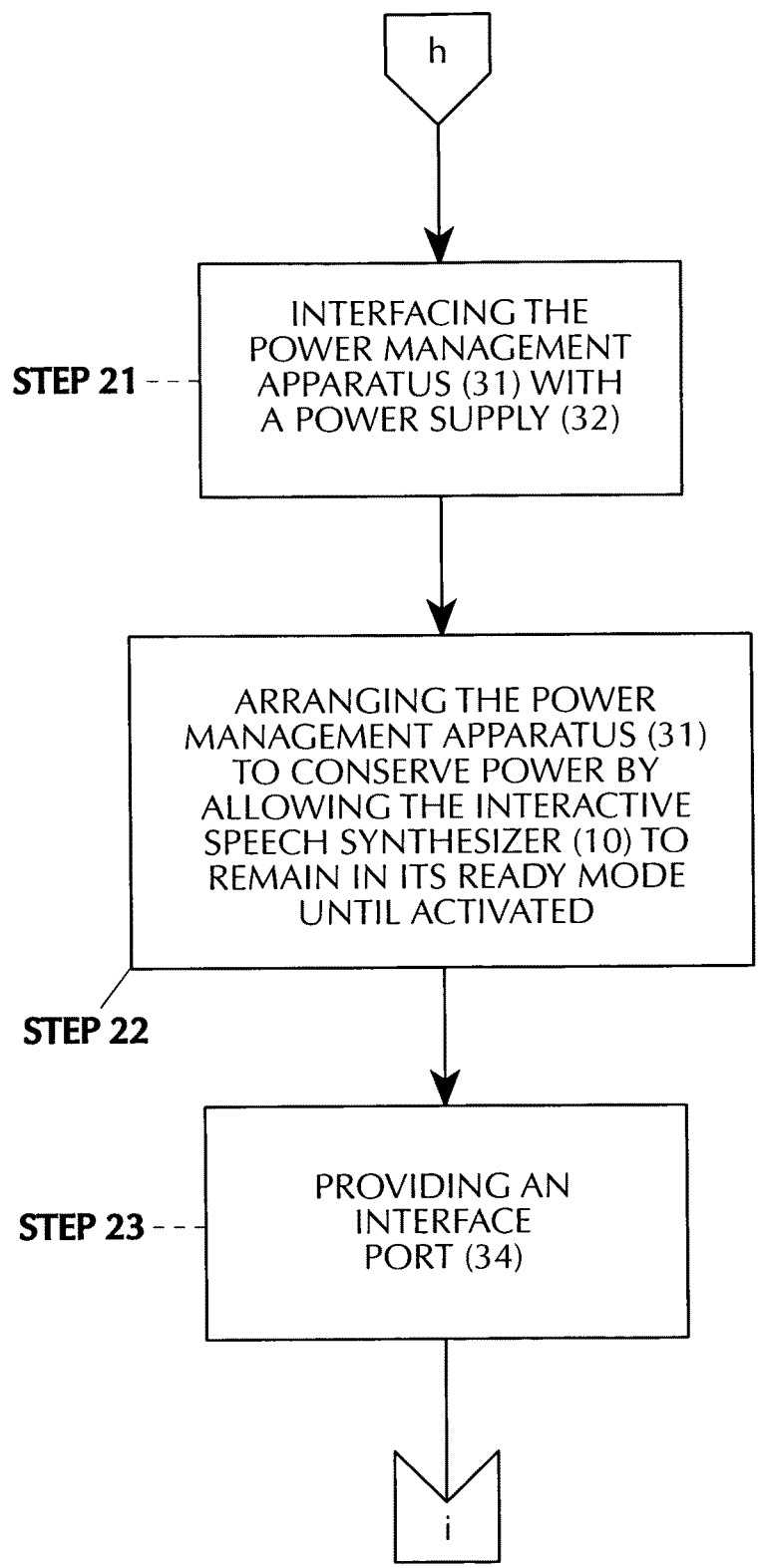
Figure 4J:
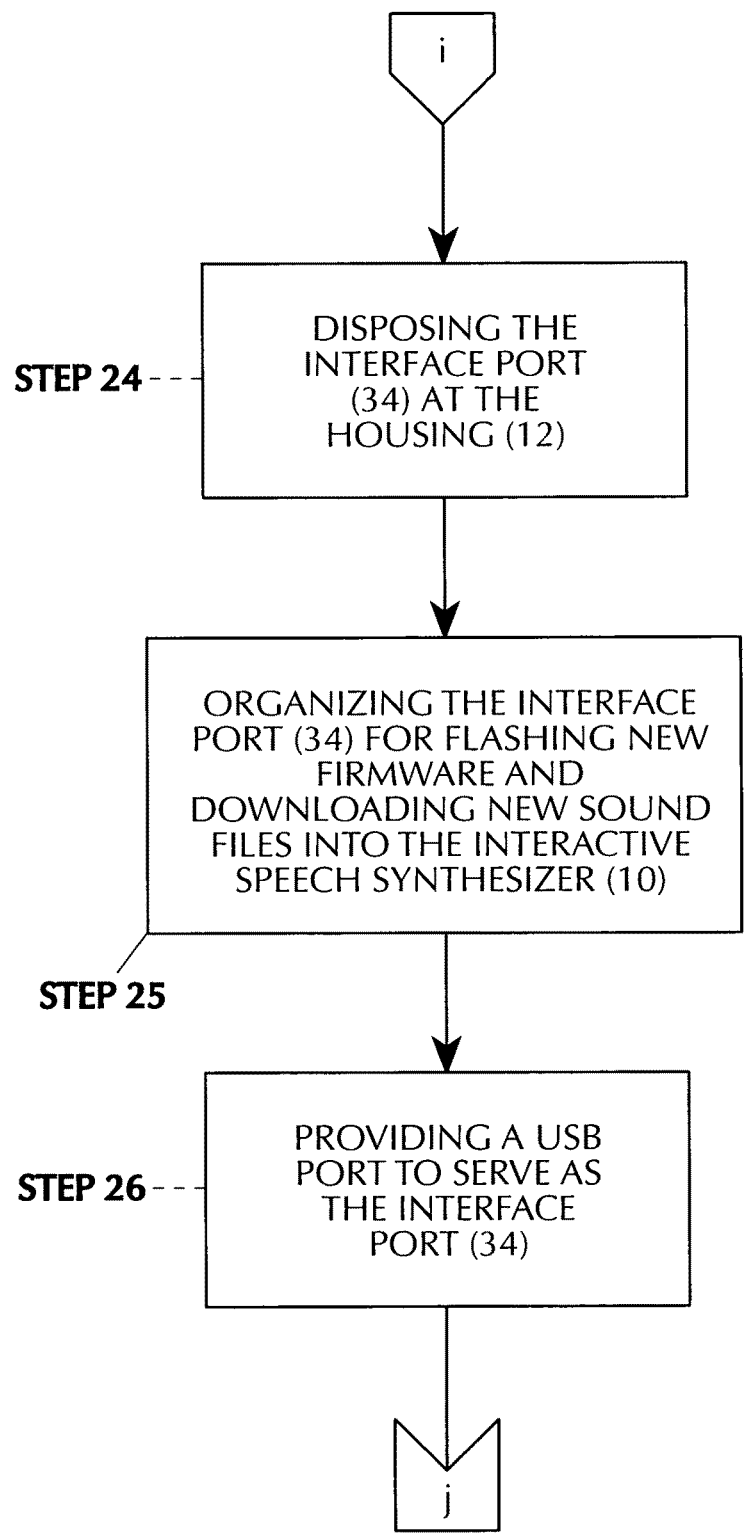
Figure 4K:
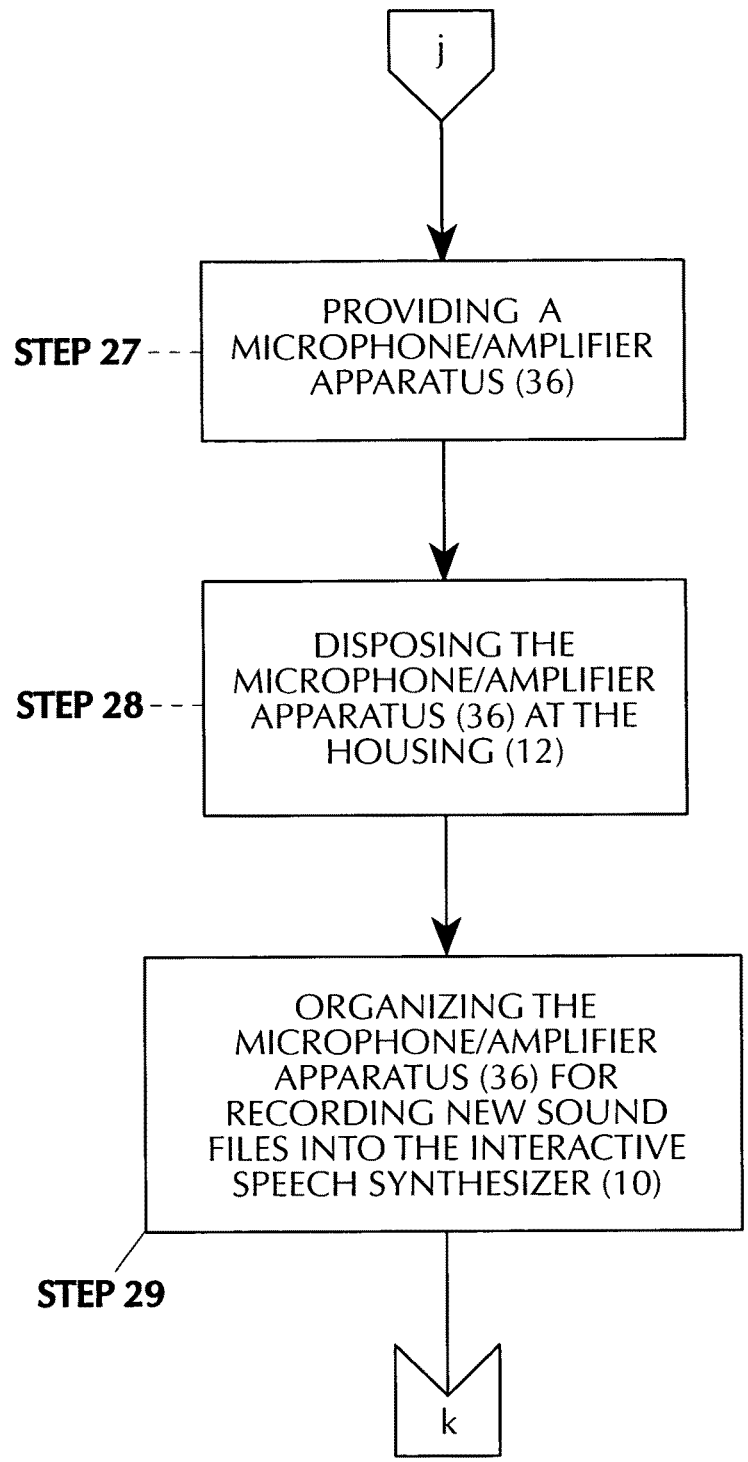
Figure 4L:
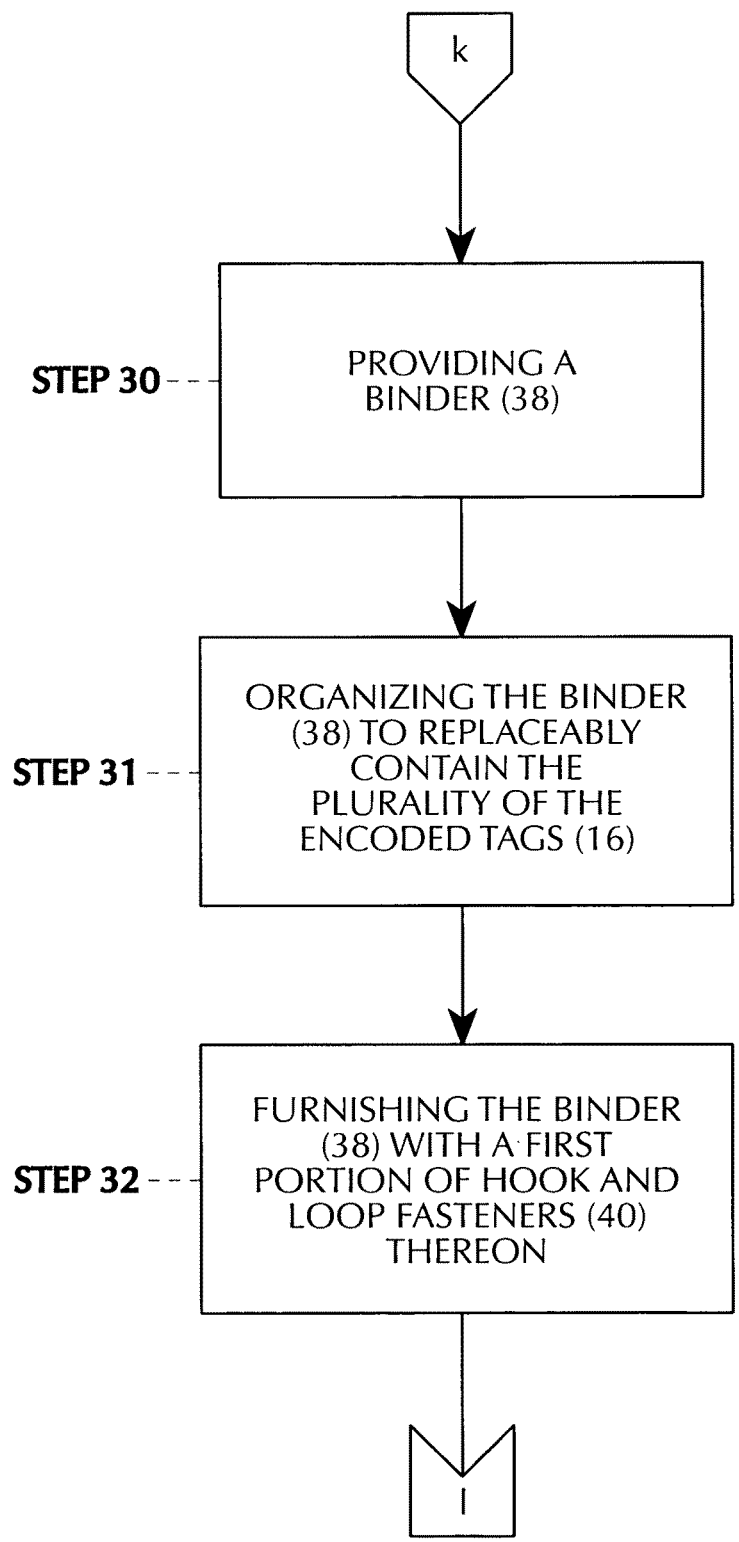
Figure 4M:
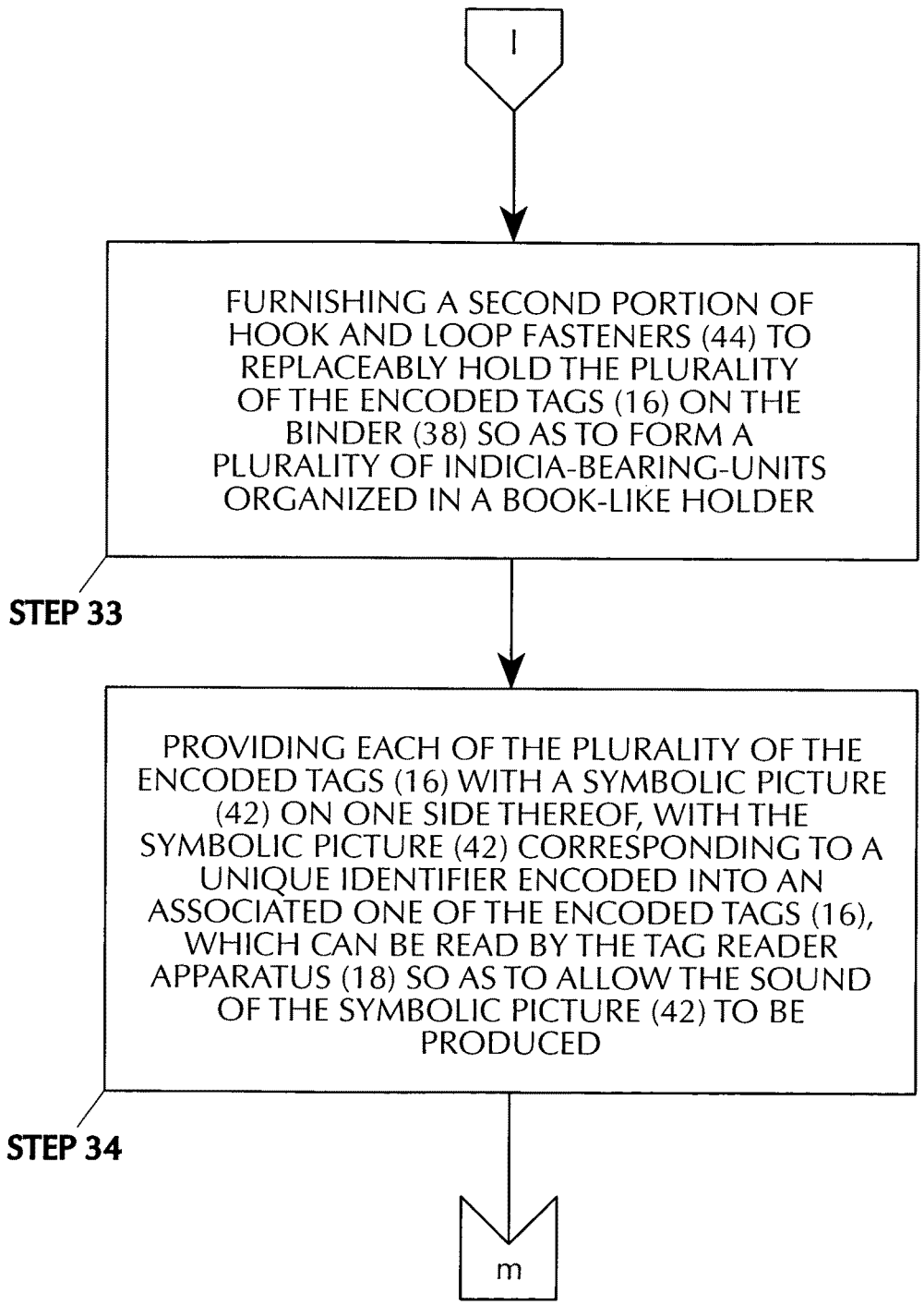
Figure 4N:
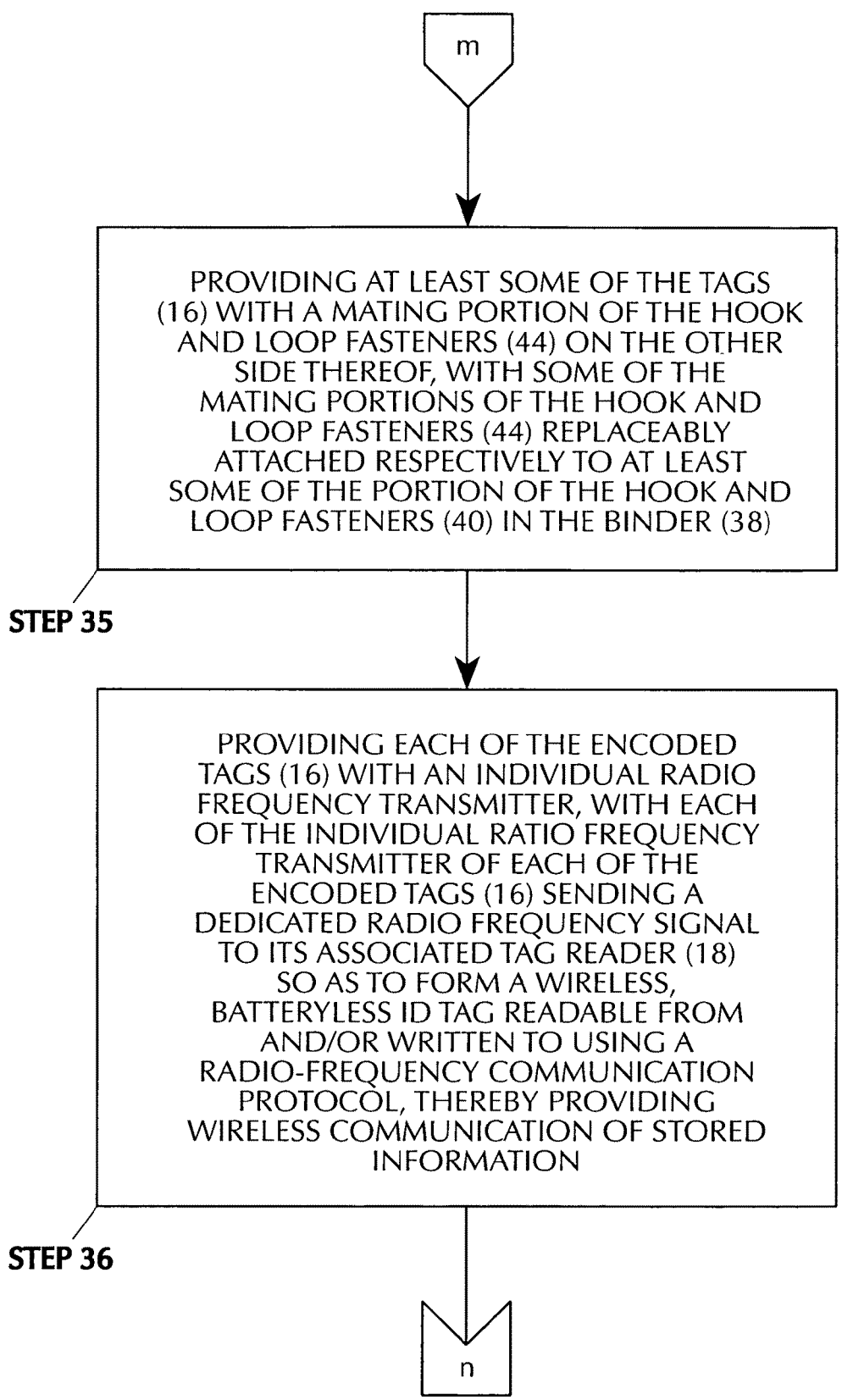
Figure 4O:
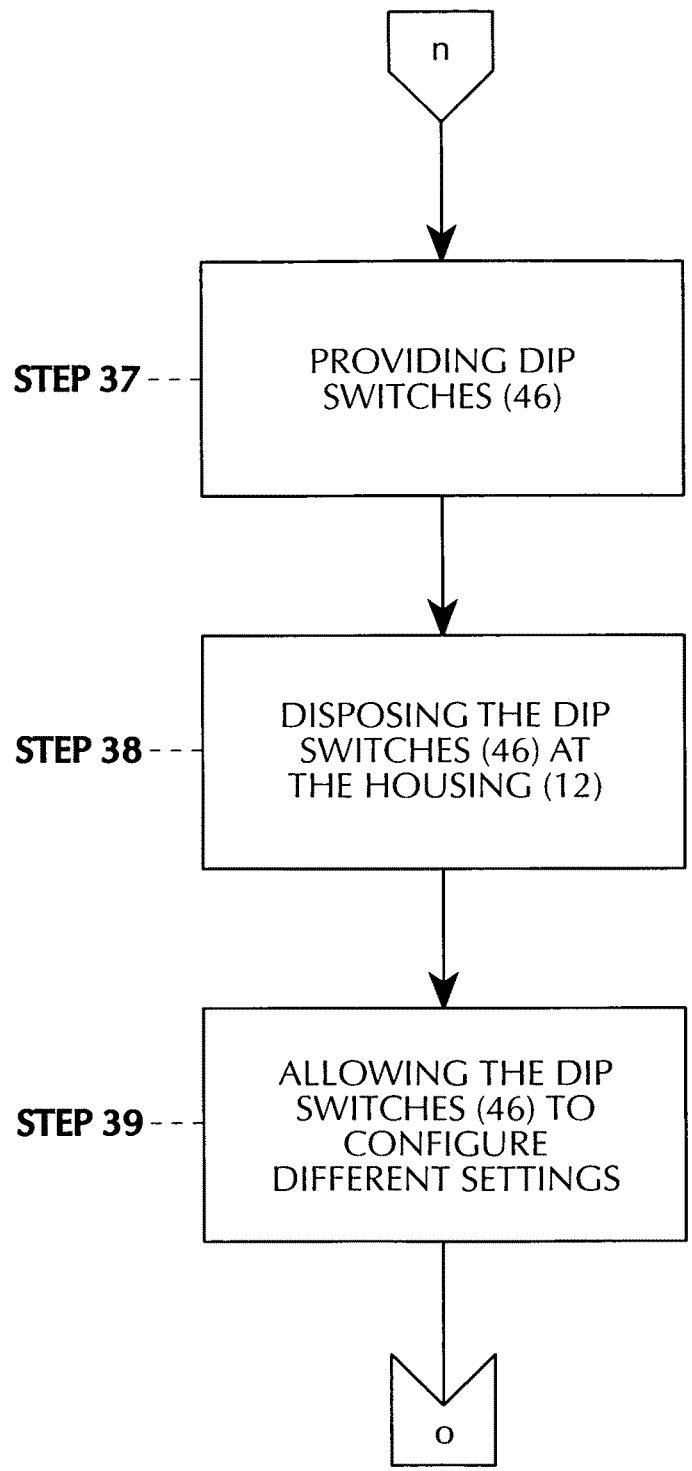
Figure 4P:
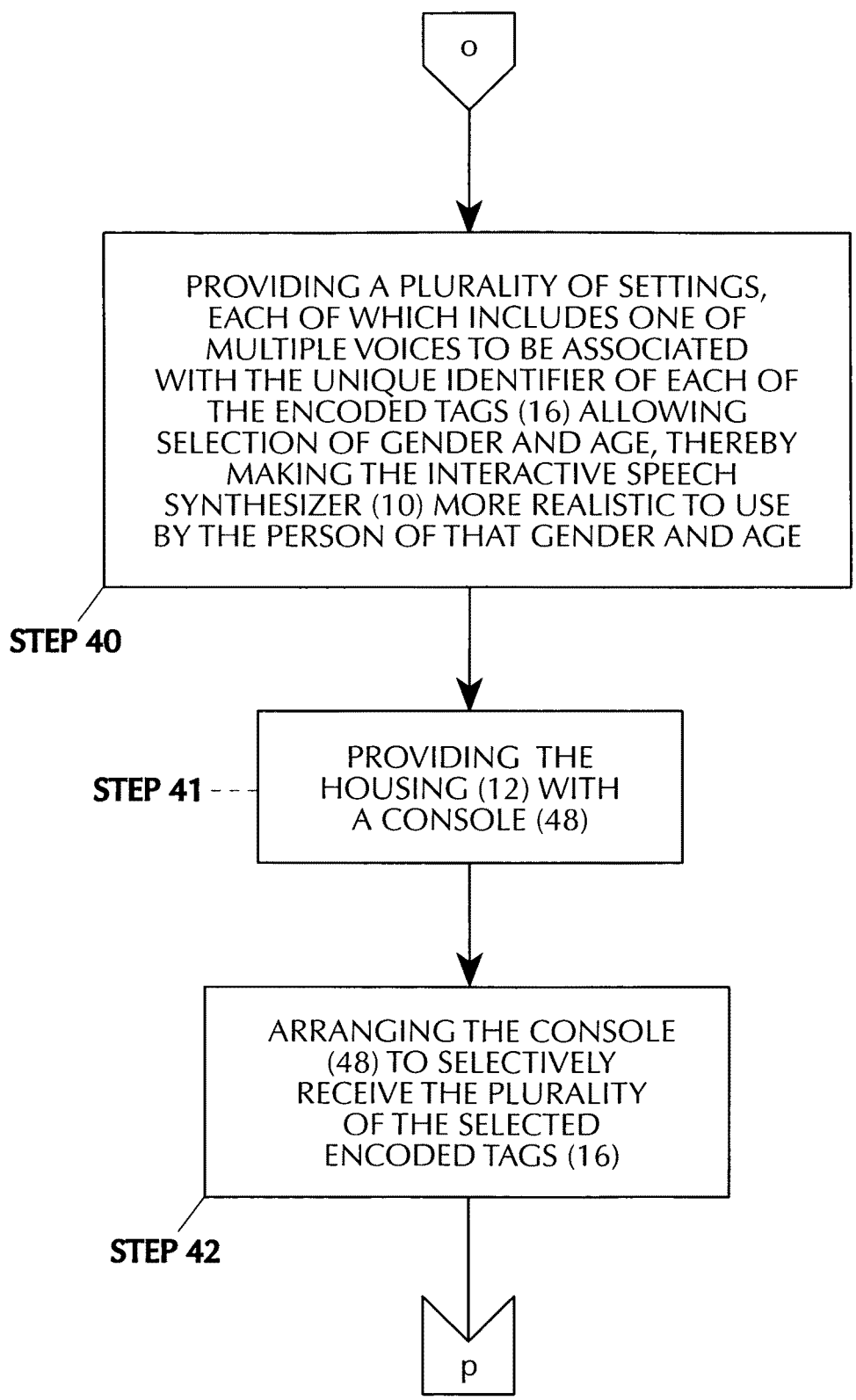
Figure 4Q:
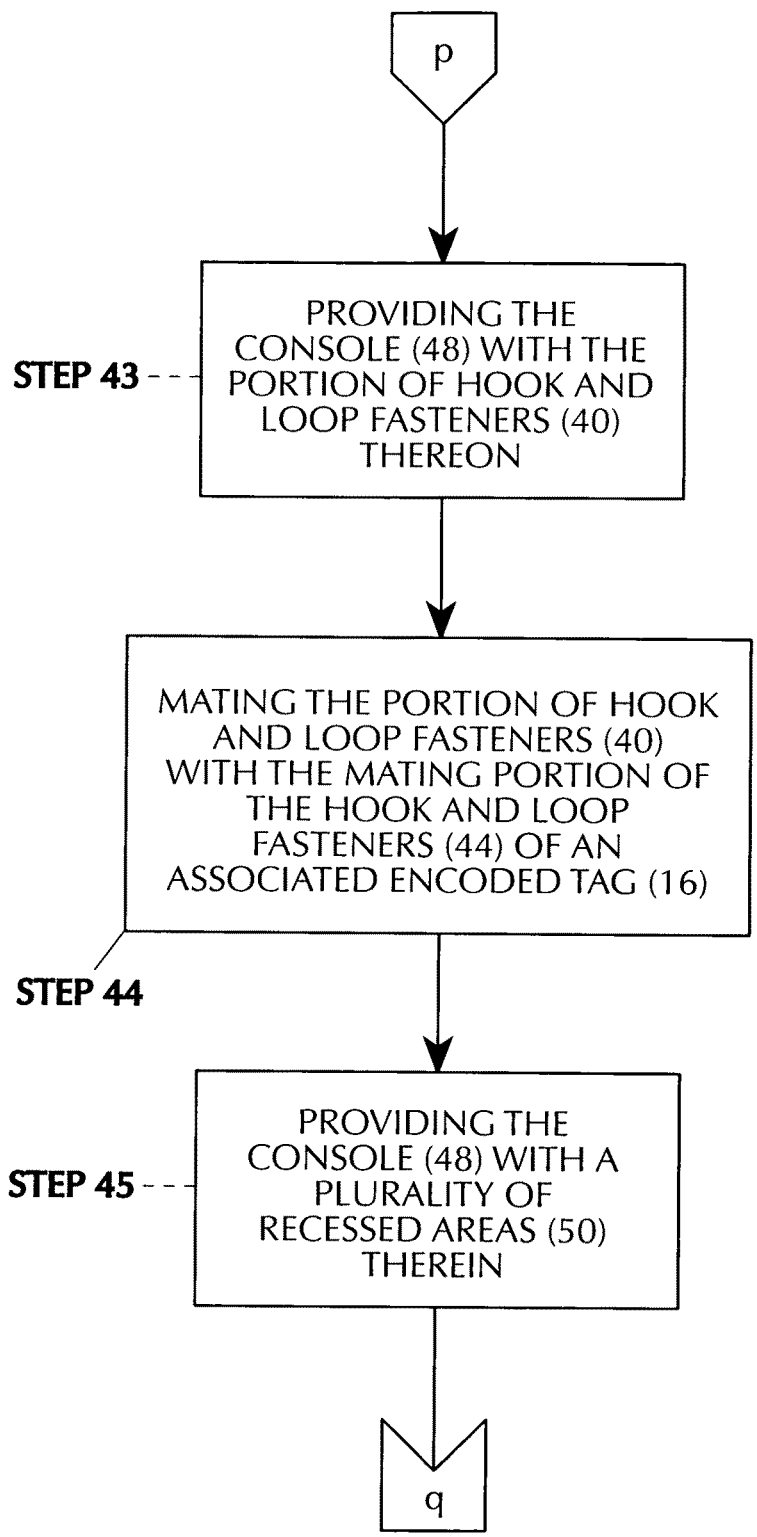
Figure 4R:
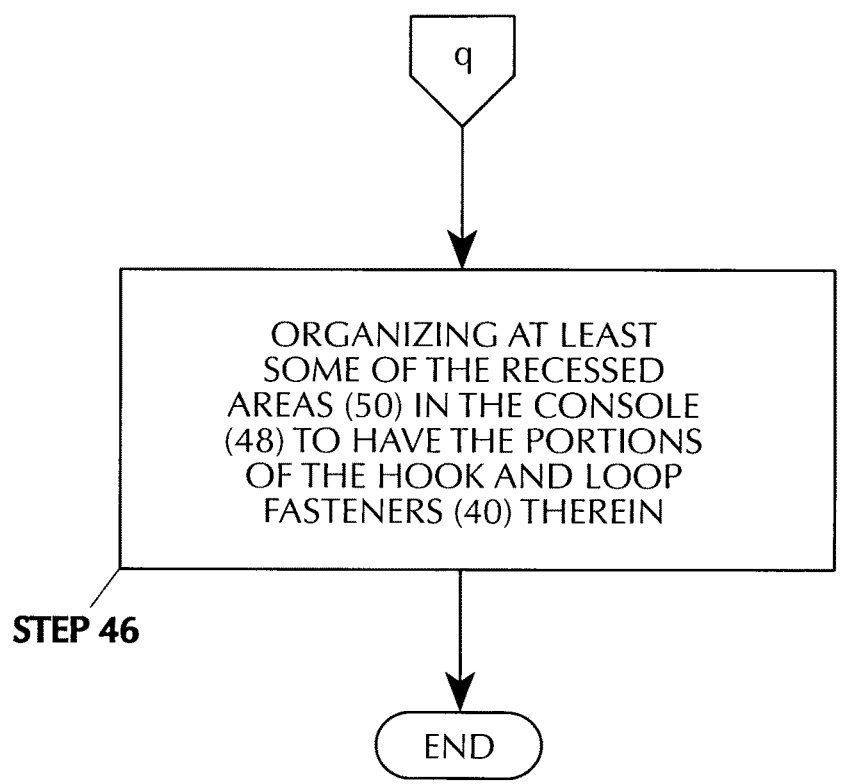

FIG. 3 a diagrammatic block diagram of the interactive speech synthesizer of the present invention for enabling people who cannot talk but who are familiar with use of anonym moveable picture communication to autonomously communicate using verbal language shown in FIG. 1; and FIGS. 4A-4R are a flowchart of the method for enabling a person who cannot talk but who is familia with use of anonym moveable picture communication to autonomously communicate speech sound automatically in sequence.

5. LIST OF REFERENCE NUMERALS UTILIZED IN THE DRAWING

A. General.
10 interactive speech synthesizer of present invention for enabling people who cannot talk but who are familiar with use of anonym moveable picture communication to autonomously communicate using verbal language
B. Configuration of Interactive Speech Synthesizer 10.
12 housing
14 microcontroller
16 at least one encoded tag
18 at least one tag reader
20 coil of each tag reader of at least one tag reader 18
22 audio output device
24 speaker of audio output device 22
26 memory
28 activation apparatus
30 at least one switch of activation apparatus 28
31 power management apparatus for interfacing with power supply 32
32 power supply
34 interface port for flashing new firmware and downloading new sound bit files into memory 26
36 microphone/amplifier for recording new sound bit files into memory 26
38 binder
40 portion of hook and loop fasteners on binder 38
42 symbolic picture on one side of each encoded tag of at least one encoded tag 16
44 mating portion of hook and loop fasteners on other side of each encoded tag of at least one encoded tag 16
46 dip switches
48 console of housing 12
50 recessed areas in console 48 of housing 12

6. DETAILED DESCRIPTION OF THE INVENTION

A. General.

Referring now to the drawing, in which like numerals indicate like parts, and particularly to FIG. 1, which is a diagrammatic perspective view of the interactive speech synthesizer of the present invention for enabling people who cannot talk but who are familiar with use of anonym moveable picture communication to autonomously communicate using verbal language, the interactive speech synthesizer of the present invention is shown generally at 10 for enabling people who cannot talk but who are familiar with use of anonym moveable picture communication to autonomously communicate using verbal language.

B. The Configuration of the Interactive Speech Synthesizer 10.

Figure 2:
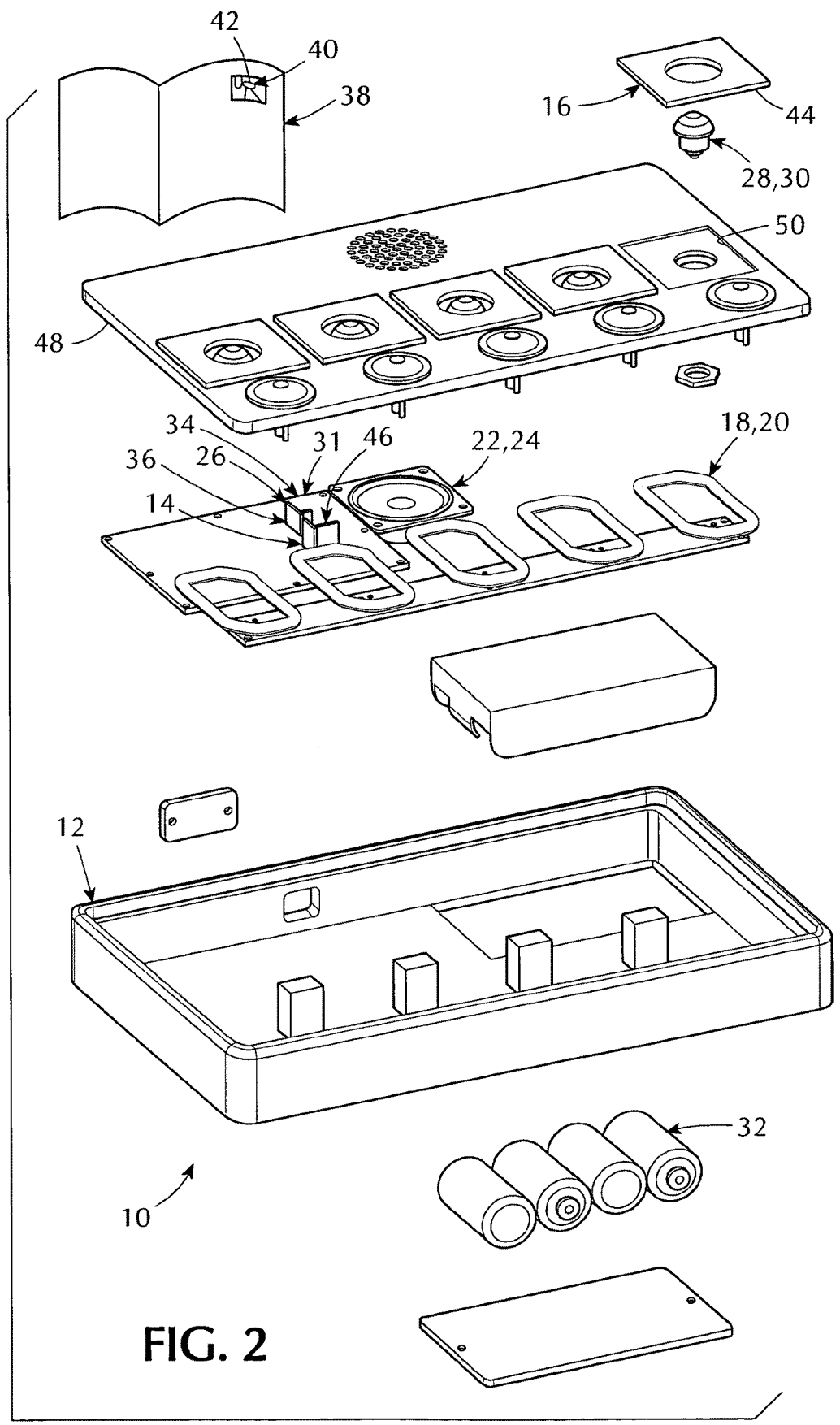
FIG. 2 is an exploded diagrammatic perspective view of the interactive speech synthesizer of the present invention for enabling people who cannot talk but who are familiar with use of anonym moveable picture communication to autonomously communicate using verbal language shown in FIG. 1.

The configuration of the interactive speech synthesizer 10 can best be seen in FIGS. 2 and 3, which are, respectively, an exploded diagrammatic perspective view of the interactive speech synthesizer of the present invention for enabling people who cannot talk but who are familiar with use of anonym moveable picture communication to autonomously communicate using verbal language shown in FIG. 1, and a diagrammatic block diagram of the interactive speech synthesizer of the present invention for enabling people who cannot talk but who are familiar with use of anonym moveable picture communication to autonomously communicate using verbal language shown in FIG. 1, and as such, will be discussed with reference thereto.

The interactive speech synthesizer 10 comprises a housing 12, a microcontroller 14, at least one encoded tag 16—preferably RFID, at least one tag reader 18—preferably a coil 20, and an audio output device 22—preferably a speaker 24. The microcontroller 14, the at least one tag reader 18, and the audio output device 22 are disposed at the housing 12, and the at least one encoded tag 16 is replaceably attached to the housing 12. The at least one tag reader 18 reads data from an associated encoded tag 16, which has been replaceably attached thereat, to form a coded signal and transmits the coded signal to the microcontroller 14 that looks up a sound bit file corresponding to the coded signal and sends the sound bit file to the audio output device 22 to convert into sound, thereby allowing a sound corresponding to the selected tag 16 to be produced to thereby generate, automatically and sequentially, unique audible information associated with the data of each encoded tag 16.

The interactive speech synthesizer 10 further comprises memory 26. The memory 26 is disposed at the housing 14 and stores the sound bit files—by addresses—to be looked up by the microcontroller 14.

The interactive speech synthesizer 10 further comprises activation apparatus 28—preferably at least one switch 30. The activation apparatus 28 is disposed at the housing 12, and when activated, activates the microcontroller 14 and the at least one tag reader 18 to read the data from an associated encoded tag 16, thereby triggering the sounds.

The interactive speech synthesizer 10 further comprises power management apparatus 31. The power management apparatus 31 is disposed at the housing 12, is for interfacing with a power supply 32—preferably batteries, and conserves power by allowing the interactive speech synthesizer 10 to remain in sleep mode until the activation apparatus 28 is activated.

The interactive speech synthesizer 10 further comprises an interface port 34—preferably USB. The interface port 34 is disposed at the housing 12 and is for flashing new firmware and downloading new sound bit files into the memory 26.

The interactive speech synthesizer 10 further comprises a microphone/amplifier 36. The microphone/amplifier 36 is disposed at the housing 12 and is for recording new sound bit files into the memory 26.

The interactive speech synthesizer 10 further comprises a binder 38. The binder 38 replaceably contains the at least one encoded tag 16, and has a portion 40 of hook and loop fasteners thereon that replaceably holds the at least one encoded tag 16 thereon so as to form a plurality of unique indicia bearing units organized in a selected sequence retained in a book-like holder.

Each encoded tag 16 has a symbolic picture 42 on one side thereof corresponding to a unique identifier encoded into an associated encoded tag 16 that can be read by the at least one tag reader 18 so as to allow the sound of the symbolic picture 42 to be produced, and on the other side thereof, a mating portion 44 of the hook and loop fasteners replaceably attach to the portion 40 of the hook and loop fasteners in the binder 38. Each encoded tag 16 has an individual radio frequency transmitter sending a dedicated radio frequency signal to the at least one tag reader 18 so as to form a wireless, batteryless ID tag readable from and/or written to using a radio-frequency communication protocol, thereby providing wireless communication of stored information.

The interactive speech synthesizer 10 further comprises dip switches 46. The dip switches 46 are disposed at the housing 12 and allow different settings to be configured, such as multiple voices to be associated with the unique identifier of each encoded tag 16 allowing selection of gender and age, thereby making the interactive speech synthesizer 10 more realistic to use for all who may use it.

The housing 12 has a console 48 with recessed areas 50 therein that selectively receive the at least one encoded tag 16, respectively. The recessed areas 50 in the console have the portions 40 of the hook and loop fasteners therein that mate with the mating portion 44 of the hook and loop fasteners of an associated encoded tag 16.

In general operation, a user takes desired encoded tags 16 off of the binder 38 and places them in the recessed areas 50 in to console 48, respectively, where they are replaceably attached by the hook and loop fasteners 40, 44. Once the encoded tags 16 are assembled as desired, the user presses an associated activation apparatus 28 in succession, thereby forming a phrase or sentence. As each encoded tag 16 is pressed, the at least one tag reader 18 reads and stores the unique identifier of the associated encoded tag 16 to produce associated sounds in sequence, allowing the interactive speech synthesizer 10 to communicate with other people.

C. Method

The method for enabling a person who cannot talk but who is familia with use of anonym moveable picture communication to autonomously communicate speech sound automatically in sequence can best be sen in FIGS. 4A-4R, which are, respectively, a flowchart of the method for enabling a person who cannot talk but who is familia with use of anonym moveable picture communication to autonomously communicate speech sound automatically in sequence, and as such, will be discussed with reference thereto.

The method for enabling a person, who cannot talk but who is familiar with use of anonym moveable picture communication, to autonomously communicate speech sound automatically in a sequence comprises the steps of:

STEP 1: Choosing a plurality of selected encoded tags 16—each having apparatus for it to be identified by the person;

STEP 2: Providing an interactive speech synthesizer 10 which comprises a housing 12, a microcontroller 14, the plurality of the selected encoded tags 16, a plurality of tag reader apparatus 18—each adapted to read an associated one of the selected plurality of the encoded tags 16, an audio output device 22, and memory 26;

STEP 3: Positioning the microcontroller 14, the plurality of the tag reader apparatus 18, and the audio output device 22 all at the housing 12;

STEP 4: Arranging each of the plurality of the selected encoded tags 16 to be movable between a ready mode wherein it is proximate to its associated tag reader apparatus 18, and a go mode wherein it is in operative association with its associated tag reader apparatus 18;

STEP 5: Providing apparatus for the person to move one, some, or all of the plurality of the encoded tags 16 from their ready mode to their go mode according to the sequence;

STEP 6: Providing in the go mode for each of the plurality of the tag reader apparatus 18 to read data from its associated one of the selected plurality of the encoded tags 16 in the sequence to provide a series of coded signals;

STEP 7: Transmitting the series of coded signals to the microcontroller 14;

STEP 8: Causing the microcontroller 14 to organize a sound file corresponding to the series of coded signals;

STEP 9: Transmitting the sound file to the audio output device 22 to convert the sound file automatically into the speech sound;

STEP 10: Providing for each of the plurality of the selected encoded tags 16 in its go mode to be replaceably attachable to its associated reader apparatus 18 at the housing 12;

STEP 11: Positioning the memory 26 at the housing 12;

STEP 12: Storing the sound file in the memory 26 to be looked up by the microcontroller 14;

STEP 13: Arranging the sound file in the memory 26 by addresses;

STEP 14: Providing each of the tag reader apparatus 18 as a coil 20;

STEP 15: Providing a speaker 24 as the audio output device 22;

STEP 16: Providing activation apparatus 28, with the activation apparatus 28 positioned at the housing 12;

STEP 17: Arranging the activation apparatus 28 when activated to activate the microcontroller 14 and each of the tag reader apparatus 18 to read the data in the sequence from associated selected encoded tag 16, thereby triggering the speech sounds;

STEP 18: Providing at least one switch 30 as the activation apparatus 28;

STEP 19: Providing power management apparatus 31;

STEP 20: Disposing the power management apparatus 31 at the housing 12;

STEP 21: Interfacing the power management apparatus 31 with a power supply 32;

STEP 22: Arranging the power management apparatus 31 to conserve power by allowing the interactive speech synthesizer 10 to remain in its ready mode until activated;

STEP 23: Providing an interface port 34;

STEP 24: Disposing the interface port 34 at the housing 12;

STEP 25: Organizing the interface port 34 for flashing new firmware and downloading new sound files into the interactive speech synthesizer 10;

STEP 26: Providing a USB port to serve as the interface port 34;

STEP 27: Providing a microphone/amplifier apparatus 36;

STEP 28: Disposing the microphone/amplifier apparatus 36 at the housing 12;

STEP 29: Organizing the microphone/amplifier apparatus 36 for recording new sound files into the interactive speech synthesizer 10;

STEP 30: Providing a binder 38;

STEP 31: Organizing the binder 38 to replaceably contain the plurality of the encoded tags 16;

STEP 32: Furnishing the binder 38 with a first portion of hook and loop fasteners 40 thereon;

STEP 33: Furnishing a second portion of hook and loop fasteners 44 to replaceably hold the plurality of the encoded tags 16 on the binder 38 so as to form a plurality of indicia-bearing-units organized in a book-like holder;

STEP 34: Providing each of the plurality of the encoded tags 16 with a symbolic picture 42 on one side thereof, with the symbolic picture 42 corresponding to a unique identifier encoded into an associated one of the encoded tags 16, which can be read by the tag reader apparatus 18 so as to allow the sound of the symbolic picture 42 to be produced;

STEP 35: Providing at least some of the tags 16 with a mating portion of the hook and loop fasteners 44 on the other side thereof, with some of the mating portions of the hook and loop fasteners 44 replaceably attached respectively to at least some of the portion of the hook and loop fasteners 40 in the binder 38;

STEP 36: Providing each of the encoded tags 16 with an individual radio frequency transmitter, with each of the individual ratio frequency transmitter of each of the encoded tags 16 sending a dedicated radio frequency signal to its associated tag reader 18 so as to form a wireless, batteryless ID tag readable from and/or written to using a radio-frequency communication protocol, thereby providing wireless communication of stored information;

STEP 37: Providing dip switches 46;

STEP 38: Disposing the dip switches 46 at the housing 12;

STEP 39: Allowing the dip switches 46 to configure different settings;

STEP 40: Providing a plurality of settings, each of which includes one of multiple voices to be associated with the unique identifier of each of the encoded tags 16 allowing selection of gender and age, thereby making the interactive speech synthesizer 10 more realistic to use by the person of that gender and age;

STEP 41: Providing the housing 12 with a console 48;

STEP 42: Arranging the console 48 to selectively receive the plurality of the selected encoded tags 16;

STEP 43: Providing the console 48 with the portion of hook and loop fasteners 40 thereon;

STEP 44: Mating the portion of hook and loop fasteners 40 with the mating portion of the hook and loop fasteners 44 of an associated encoded tag 16;

STEP 45: Providing the console 48 with a plurality of recessed areas 50 therein; and STEP 46: Organizing at least some of the recessed areas 50 in the console 48 to have the portions of the hook and loop fasteners 40 therein.

D. Impressions.

It will be understood that each of the elements described above, or two or more together, may also find a useful application in other types of constructions differing from the types described above.

While the embodiments of the present invention have been illustrated and described as embodied in an interactive speech synthesizer for enabling people who cannot talk but who are familiar with use of anonym moveable picture communication to autonomously communicate using verbal language, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. A method for enabling a person who cannot talk, but who is familiar with use of anonym moveable picture communication, to autonomously communicate speech sound automatically in a sequence, said method comprising the steps of:

providing a plurality of selected encoded radio frequency identification (RFID) tags, and each of said plurality of selected encoded RFID tags having a drawing of a linguistic expression on its exterior surface, viewable by a person who cannot talk;

providing an interactive speech synthesizer for autonomously communicating verbal language to said person, said interactive speech synthesizer comprising:

(i) a housing having an interior space and an exterior surface;

(ii) a plurality of RFID tag reader means;

(iii) a microcontroller capable of receiving electronic signals from said plurality of RFID tag reader means and accessing, in response to said electronic signals, a database of a plurality of sound files corresponding to a plurality of linguistic expressions identifiable by a corresponding an identification (ID) encoded in one or more encoded RFID tags or said selected encoded RFID tags;

(iv) an audio output device;

(v) a memory device storing said database;

(vi) a plurality of controlling means connected with said plurality of RFID tag reader means disposed on said exterior surface; and (vii) an activation module for activating said microcontroller and each of said tag reader means, wherein said activation module is positioned within said housing;

wherein said microcontroller, said plurality of RFID tag reader means, and said audio output device are arranged at the inside space of said housing;

arranging each of said plurality of selected encoded RFID tags to be movable between a ready mode, wherein each of said plurality of selected encoded RFID tags is proximate to said tag reader means, and a go mode, wherein each of said plurality of selected encoded tags is in operative association with said tag reader means;

moving one or more of said plurality of selected RFID encoded tags from said ready mode to said go mode in a desired sequential order to automatically produce a desired sequence of said linguistic expressions from said audio output device;

providing in the go mode for each of said plurality of tag reader means the capability to transmit a radio frequency signal from a corresponding selected encoded RFID tag to be received by said RFID tag reader means, wherein said received radio frequency contains an ID coded signal;

transmitting a series of said ID coded signals to said speech synthesizer, said series of ID coded signals corresponding to said sequence of linguistic expressions;

causing, by said microcontroller, said speech synthesizer to organize a sound file corresponding to said series of ID coded signals;

transmitting said sound file to said audio output device to convert said sound file automatically into a speech sound corresponding to said sequence of linguistic expressions from the selected encoded RFID tags;

integrating an interface port in communication with said microcontroller, wherein said interface port enables downloading a set of new sound files into said database, wherein each RFID tag is re-assignable to correspond to at least one of a desired linguistic expression and sound file;

wherein the RFID tags are storable in a desired sequence and readable by the RFID tag reader means while stored in the desired sequence without necessitating a reconstruction of the sequence to effect a physical cowling with the RFID tag reader means; and wherein user generated sentences comprising the sequences of a plurality of RFID tags can be stored and later retrieved as desired.

2. The method of claim 1, further comprising the steps of:
(a) providing for each of said plurality of selected encoded RFID tags in its go mode to be replaceably attachable to its associated reader means at said housing;
(b) positioning said memory at said housing;
(c) storing said sound file in said memory to be retrieved by said microcontroller under control of an application; and
(d) arranging said sound file in said memory by addresses.

3. The method of claim 1, wherein each of said tag reader means is a coil.

4. The method of claim 1, wherein said audio output device is a speaker.

5. The method of claim 1, further comprising the steps of:
arranging said activation module so that when activated, said activation module will activate said microcontroller and activate each of said tag reader means to read said ID coded signals in said sequence from an associated selected encoded RFID tag, thereby triggering said speech sounds.

6. The method of claim 5, further comprising the step of providing at least one switch as said activation module.

7. The method of claim 1, further comprising the steps of:
(a) providing a power management means;
(b) disposing said power management means at said housing;
(c) interfacing said power management means with a power supply; and
(d) arranging said power management means to conserve power by allowing said interactive speech synthesizer to remain in its ready mode until activated.

8. The method of claim 1, further comprising the steps of:
(a) disposing said interface port at said housing; and
(b) arranging said interface port for flashing new firmware and for downloading a set of new sound files into said interactive speech synthesizer.

9. The method of claim 8, further comprising the step of providing a universal serial bus (USB) port to serve as said interface port.

10. The method of claim 1, further comprising the steps of:
(a) providing a microphone;
(b) disposing said microphone at said housing; and
(c) organizing the integrating said microphone for recording said set of new sound files into said interactive speech synthesizer.

11. The method of claim 1, further comprising the steps of:
(a) providing a binder; and
(b) organizing said binder to replaceably contain said plurality of encoded RFID tags of said interactive speech synthesizer.

12. The method of claim 11, further comprising the steps of:
(a) furnishing said binder with a first portion of hook and loop fasteners thereon; and
(b) furnishing a second portion of hook and loop fasteners to replaceably hold said plurality of encoded RFID tags on said binder so as to form a plurality of indicia-bearing-units organized in a book-like holder.

13. The method of claim 12, further comprising the step of:
providing at least some of the plurality of said encoded RFID tags with a mating portion of said hook and loop fasteners on said other side thereof, with some of said mating portions of said hook and loop fasteners replaceably attached to corresponding ones of said portion of said hook and loop fasteners in said binder.

14. The method of claim 12, further comprising the steps of:
(a) providing said housing with a console; and
(b) arranging said console to selectively receive said plurality of selected encoded RFID tags.

15. The method of claim 14, further comprising the steps of:
(a) providing said console with said portion of hook and loop fasteners thereon; and
(b) mating said portion of hook and loop fasteners with said mating portion of said hook and loop fasteners of an associated encoded RFID tag.

16. The method of claim 14, further comprising the steps of:
(a) providing said console with a plurality of recessed areas therein; and
(b) configuring at least some of said plurality of recessed areas in said console to have said portions of said hook and loop fasteners therein.

17. The method of claim 1, further comprising the steps of
(a) providing a set of one or more dip switches, wherein each of said dip switches is disposed at said housing; and
(b) allowing said dip switches to configure different settings within said interactive speech synthesizer.

18. The method of claim 17, further comprising the step of:
providing a plurality of settings, wherein each of said settings includes one of multiple voices to be associated with said unique identifier of each of said plurality of encoded RFID tags so as to select gender and age associated with said multiple voices.

\* \* \* \* \*